United States Patent
Fullerton et al.

(10) Patent No.: US 7,873,099 B2
(45) Date of Patent: *Jan. 18, 2011

(54) TIME TRANSFER USING ULTRA WIDEBAND SIGNALS

(75) Inventors: Larry W. Fullerton, Brownsboro, AL (US); Mark D. Roberts, Huntsville, AL (US); James L. Richards, Fayetteville, TN (US)

(73) Assignee: Time Domain Corporation, Huntsville, AL (US)

(*) Notice: Subject to any disclaimer, the term of this patent is extended or adjusted under 35 U.S.C. 154(b) by 0 days.

This patent is subject to a terminal disclaimer.

(21) Appl. No.: 11/980,529

(22) Filed: Oct. 31, 2007

(65) Prior Publication Data

US 2008/0151967 A1 Jun. 26, 2008

Related U.S. Application Data

(63) Continuation of application No. 11/140,535, filed on May 28, 2005, which is a continuation-in-part of application No. 10/806,131, filed on Mar. 23, 2004, now Pat. No. 7,358,888, which is a continuation of application No. 10/449,602, filed on Jun. 2, 2003, now Pat. No. 6,710,736, which is a continuation of application No. 10/131,598, filed on Apr. 25, 2002, now Pat. No. 6,573,857, which is a continuation of application No. 09/767,131, filed on Jan. 23, 2001, now Pat. No. 6,400,307, which is a continuation of application No. 09/332,502, filed on Jun. 14, 1999, now Pat. No. 6,177,903.

(51) Int. Cl.
*H04B 1/00* (2006.01)

(52) U.S. Cl. ............... 375/149; 375/354; 375/358; 342/109; 342/146; 342/104; 342/125; 342/118

(58) Field of Classification Search ............... 375/149, 375/130, 219, 342, 295, 145, 345, 358; 370/503, 370/208; 342/61, 88, 118, 64, 109, 104, 342/146, 125, 357.08, 257.09
See application file for complete search history.

(56) References Cited

U.S. PATENT DOCUMENTS 4,083,049 A 4/1978 Mattern et al.
(Continued)

FOREIGN PATENT DOCUMENTS

DE 19612579 10/1997
(Continued)

OTHER PUBLICATIONS

"Ultrawideband radar", Taylor, J.D. Microwave Symposium Digest, 1991., IEEE MTT-S International Jul. 10-14, 1991 pp. 367-370 vol. 1.
(Continued)

*Primary Examiner*—David C Payne
*Assistant Examiner*—Rahel Guarino
(74) *Attorney, Agent, or Firm*—Venable LLP; Robert S. Babayi

(57) ABSTRACT

Time is transferred from an ultra wideband (UWB) transmitter to UWB receiver by transmitting a signal structure having an associated timing reference point together with a time value for the timing reference point. The UWB receiver receives the timing signal structure by synchronizing a receiver time base to the signal structure, demodulating the time value information, and using the demodulated time value information to set a receiver clock value. Propagation delay information is used to adjust the receiver clock value by advancing the receiver clock value to account for the propagation delay. In one embodiment, propagation delay is determined from a known distance between the transmitter and receiver. In another embodiment, the transmitter and receiver are part of a two-way link wherein propagation delay is measured by round trip timing measurements.

20 Claims, 24 Drawing Sheets

U.S. PATENT DOCUMENTS

| | | | |
|---|---|---|---|
| 4,114,155 A * | 9/1978 | Raab | 342/394 |
| 4,228,538 A | 10/1980 | Scharla-Nielsen et al. | |
| 4,622,540 A | 11/1986 | Guscott et al. | |
| 4,641,317 A | 2/1987 | Fullerton | |
| 4,727,593 A | 2/1988 | Goldstein | |
| 4,743,906 A | 5/1988 | Fullerton | |
| 4,777,653 A | 10/1988 | Bonnerot et al. | |
| 4,813,057 A | 3/1989 | Fullerton | |
| 4,901,307 A | 2/1990 | Gilhousen et al. | |
| 4,907,001 A | 3/1990 | Harmuth | |
| 4,979,186 A | 12/1990 | Fullerton | |
| 4,998,245 A | 3/1991 | Tanaka et al. | |
| 5,056,109 A | 10/1991 | Gilhousen et al. | |
| 5,057,846 A | 10/1991 | Harmuth | |
| 5,134,408 A | 7/1992 | Harmuth | |
| 5,140,618 A * | 8/1992 | Kinoshita et al. | 375/368 |
| 5,148,174 A | 9/1992 | Harmuth | |
| 5,216,692 A | 6/1993 | Ling | |
| 5,245,629 A | 9/1993 | Hall | |
| 5,249,174 A * | 9/1993 | Itoh | 370/202 |
| 5,257,283 A | 10/1993 | Gilhousen et al. | |
| 5,265,121 A | 11/1993 | Stewart | |
| 5,267,262 A | 11/1993 | Wheatley, III | |
| 5,333,175 A | 7/1994 | Ariyavisitakul et al. | |
| 5,361,070 A | 11/1994 | McEwan | |
| 5,363,108 A | 11/1994 | Fullerton | |
| 5,383,219 A | 1/1995 | Wheatley, III et al. | |
| 5,396,516 A | 3/1995 | Padovani et al. | |
| 5,455,593 A * | 10/1995 | Ross | 342/375 |
| 5,457,394 A | 10/1995 | McEwan | |
| 5,461,639 A | 10/1995 | Wheatley, III et al. | |
| 5,465,094 A | 11/1995 | McEwan | |
| 5,510,800 A | 4/1996 | McEwan | |
| 5,512,834 A | 4/1996 | McEwan | |
| 5,519,400 A | 5/1996 | McEwan | |
| 5,521,600 A | 5/1996 | McEwan | |
| 5,573,012 A | 11/1996 | McEwan | |
| 5,576,627 A | 11/1996 | McEwan | |
| 5,589,838 A | 12/1996 | McEwan | |
| 5,590,408 A | 12/1996 | Weiland et al. | |
| 5,603,096 A | 2/1997 | Gilhousen et al. | |
| 5,604,730 A | 2/1997 | Tiedemann, Jr. | |
| 5,661,490 A | 8/1997 | McEwan | |
| 5,668,555 A | 9/1997 | Starr | |
| 5,677,927 A * | 10/1997 | Fullerton et al. | 375/130 |
| 5,687,169 A | 11/1997 | Fullerton | |
| 5,757,320 A | 5/1998 | McEwan | |
| 5,758,271 A | 5/1998 | Rich et al. | |
| 5,764,696 A | 6/1998 | Barnes et al. | |
| 5,766,208 A | 6/1998 | McEwan | |
| 5,767,953 A | 6/1998 | McEwan | |
| 5,774,091 A | 6/1998 | McEwan | |
| 5,784,406 A | 7/1998 | DeJaco et al. | |
| 5,812,938 A | 9/1998 | Gilhousen et al. | |
| 5,832,035 A | 11/1998 | Fullerton | |
| 5,920,278 A * | 7/1999 | Tyler et al. | 342/33 |
| 5,952,956 A | 9/1999 | Fullerton | |
| 5,969,663 A | 10/1999 | Fullerton et al. | |
| 5,982,760 A | 11/1999 | Chen | |
| 6,026,125 A | 2/2000 | Larrick, Jr. et al. | |
| 6,054,950 A * | 4/2000 | Fontana | 342/463 |
| 6,067,040 A | 5/2000 | Puglia | |
| 6,114,956 A | 9/2000 | Van Genechten | |
| 6,133,876 A | 10/2000 | Fullerton et al. | |
| 6,177,903 B1 | 1/2001 | Fullerton et al. | |
| 6,199,170 B1 * | 3/2001 | Dietrich | 713/400 |
| 6,218,979 B1 | 4/2001 | Barnes et al. | |
| 6,292,519 B1 | 9/2001 | Popovic | |
| 6,295,019 B1 | 9/2001 | Richards et al. | |
| 6,300,903 B1 | 10/2001 | Richards et al. | |
| 6,304,623 B1 | 10/2001 | Richards et al. | |
| 6,335,923 B2 | 1/2002 | Kubo et al. | |
| 6,370,109 B1 | 4/2002 | Schwartz et al. | |
| 6,373,434 B1 * | 4/2002 | Hayakawa | 342/387 |
| 6,374,085 B1 | 4/2002 | Saints et al. | |
| 6,400,307 B2 | 6/2002 | Fullerton et al. | |
| 6,421,389 B1 | 7/2002 | Jett et al. | |
| 6,492,904 B2 | 12/2002 | Richards | |
| 6,556,621 B1 | 4/2003 | Richards et al. | |
| 6,571,089 B1 | 5/2003 | Richards et al. | |
| 6,577,691 B2 | 6/2003 | Richards et al. | |
| 6,614,384 B2 | 9/2003 | Hall et al. | |
| 6,667,724 B2 | 12/2003 | Barnes et al. | |
| 6,700,939 B1 * | 3/2004 | McCorkle et al. | 375/295 |
| 6,762,712 B2 | 7/2004 | Kim | |
| 6,906,625 B1 | 6/2005 | Taylor et al. | |
| 6,937,667 B1 | 8/2005 | Fullerton et al. | |
| 2001/0035837 A1 | 11/2001 | Fullerton et al. | |
| 2002/0000916 A1 | 1/2002 | Richards | |
| 2003/0022680 A1 | 1/2003 | Shreve | |
| 2003/0043934 A1 | 3/2003 | Roberts | |
| 2003/0052776 A1 | 3/2003 | Richards | |
| 2003/0071733 A1 | 4/2003 | Hall et al. | |
| 2004/0027270 A1 | 2/2004 | Fullerton et al. | |
| 2004/0161064 A1 | 8/2004 | Brethour et al. | |
| 2005/0083199 A1 | 4/2005 | Hall et al. | |
| 2005/0105637 A1 | 5/2005 | Fitzpatrick et al. | |
| 2006/0152404 A1 | 7/2006 | Fullerton et al. | |
| 2007/0182618 A1 | 8/2007 | Fullerton et al. | |

FOREIGN PATENT DOCUMENTS

| | | |
|---|---|---|
| EP | 0744629 | 11/1996 |
| EP | 0853393 | 7/1998 |
| WO | WO-9904285 | 1/1999 |
| WO | WO-0004649 | 1/2000 |

OTHER PUBLICATIONS

Anderson, F. et al., "Ultra-wideband beamforming in sparse arrays", IEE Proceedings-H, vol. 138, No. 4, Aug. 1991, 8 pages.

Skolnik, M.I., Introduction to Radar Systems, McGraw-Hill, 1980, pp. 553-560. cited by other.

Frazier, "Surveillance Through Walls and Other Opaque Materials," IEEE 1996 National Radar Conference, Ann Arbor, MI, May 13-16, 1996, pp. 27-31.

"Intrepid Micro Track leaky cable sensor," Harman, R.K.; Security Technology, 2002. Proceedings. 36th Annual 2002 International CarnahanConference on, Oct. 20-24, 2002 Ps: 191-197.

International Search Report, dated Feb. 5, 2001, for PCT/US00/16201, prepared by European Patent Office.

Kolenchery, S. et al., Performance of Local Power Control in Peer-to-Peer Impulse Radio Networks with Bursty Traffic, Center for AdvancedComputing and Communication, 16 pages, Mar. 1997.

* cited by examiner

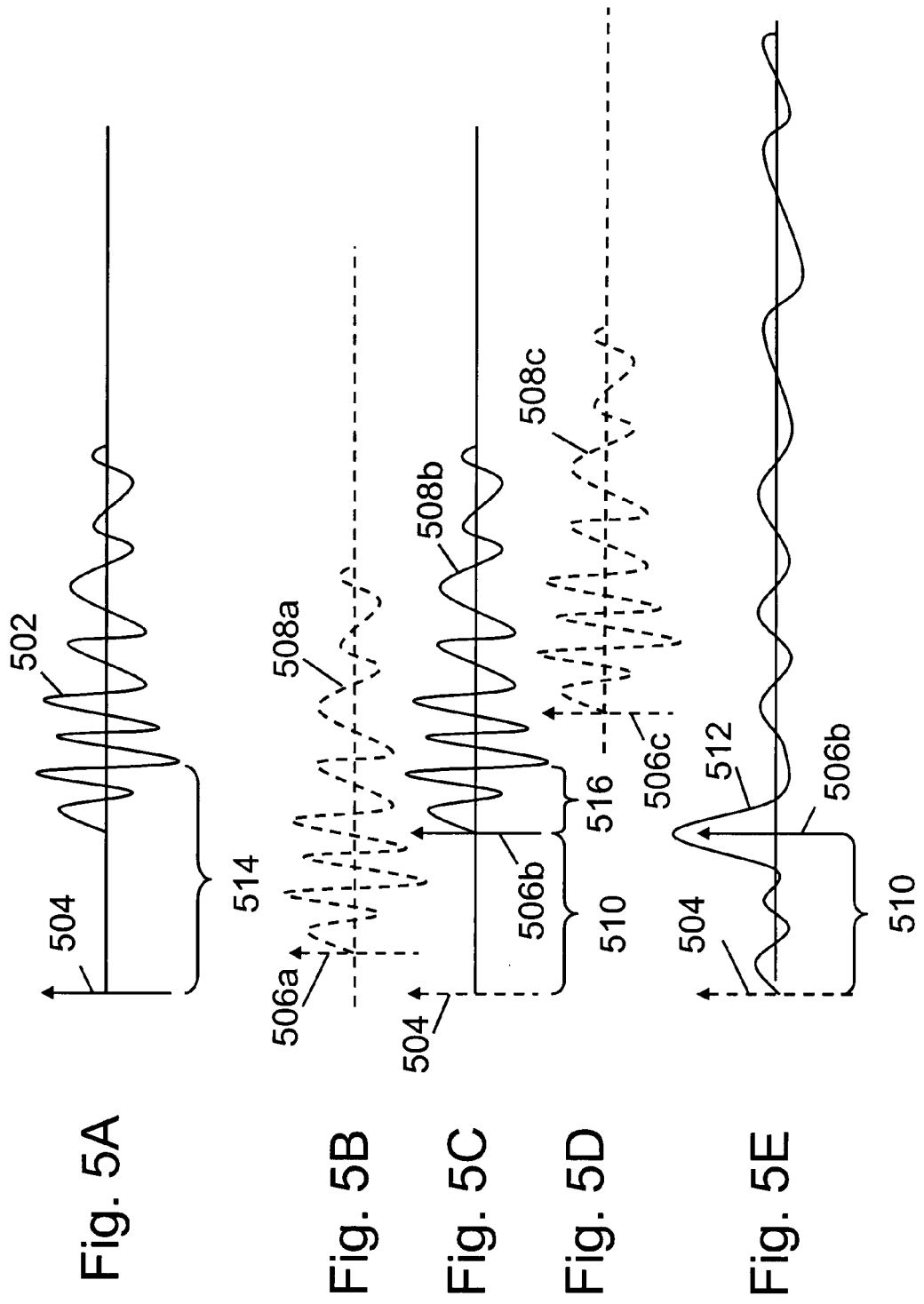

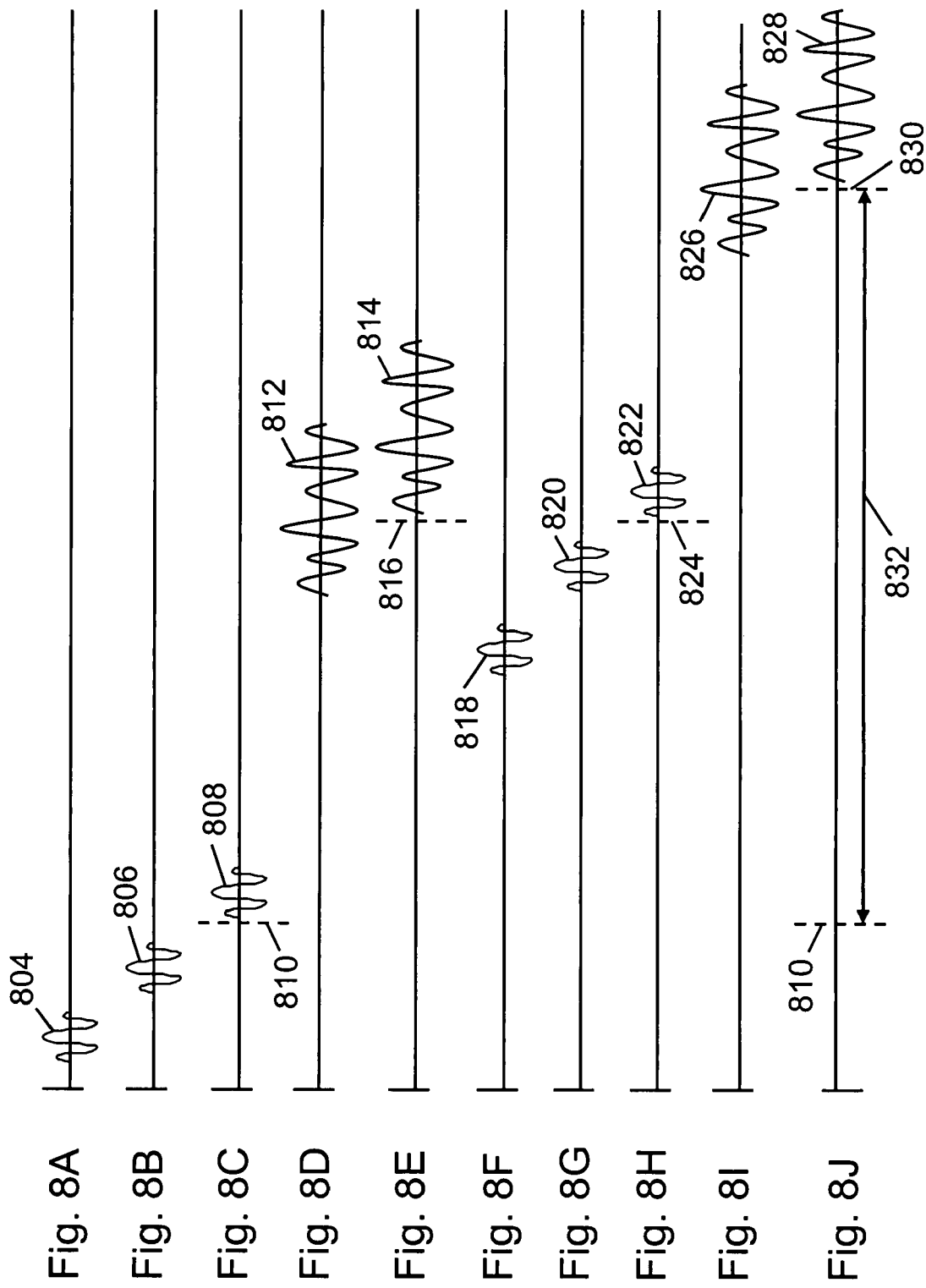

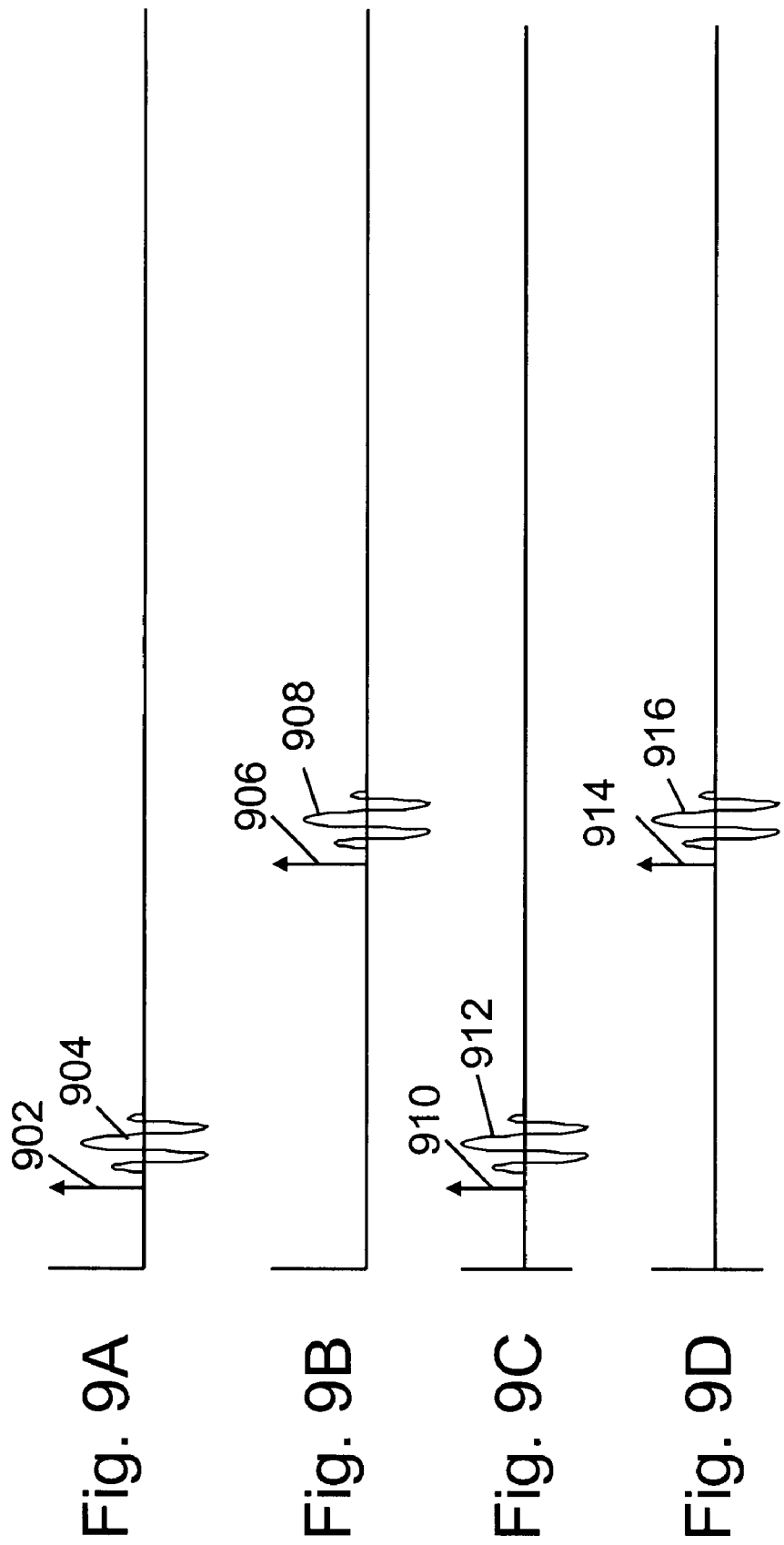

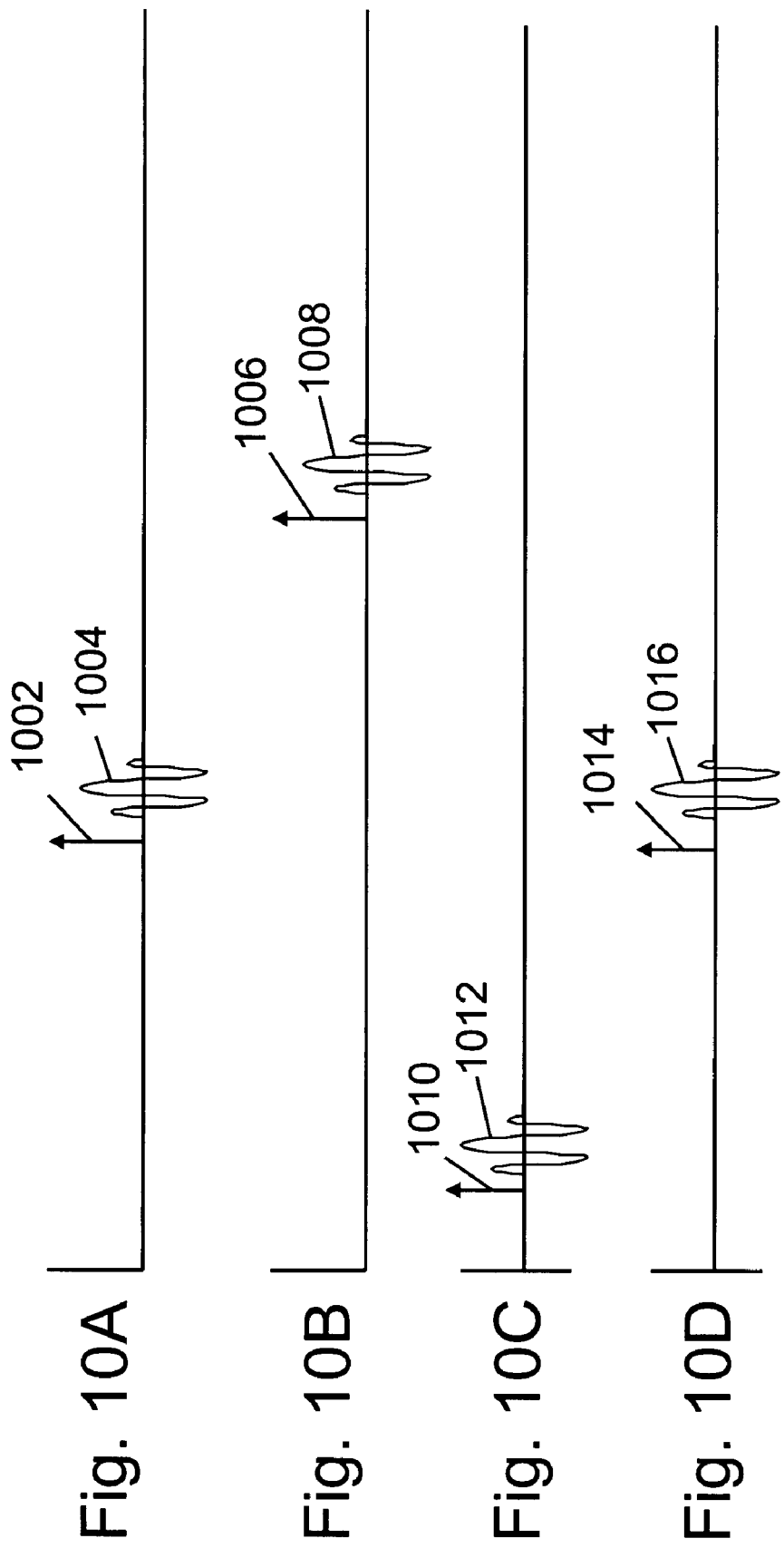

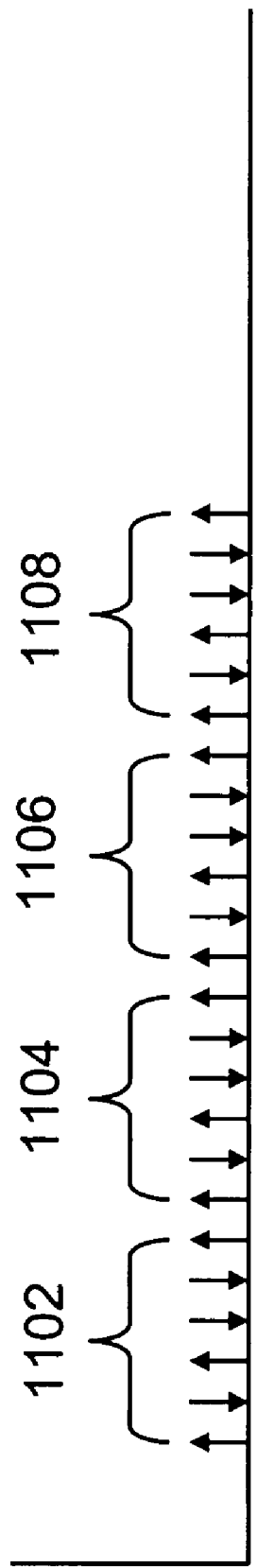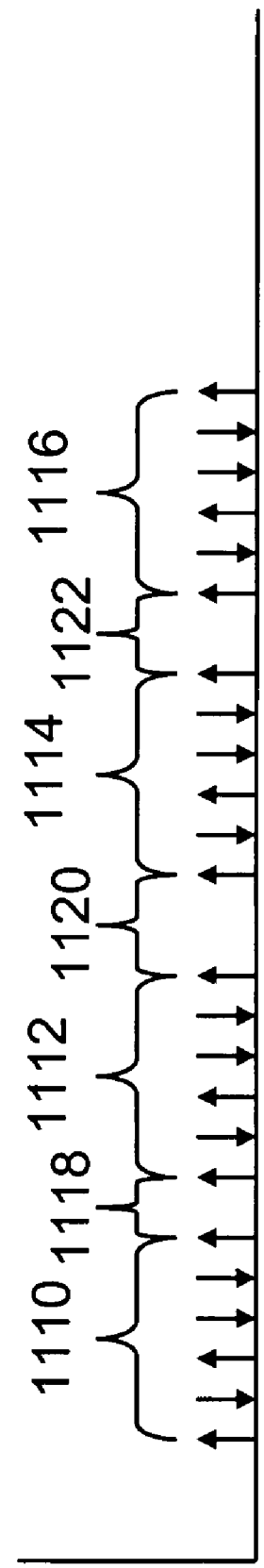

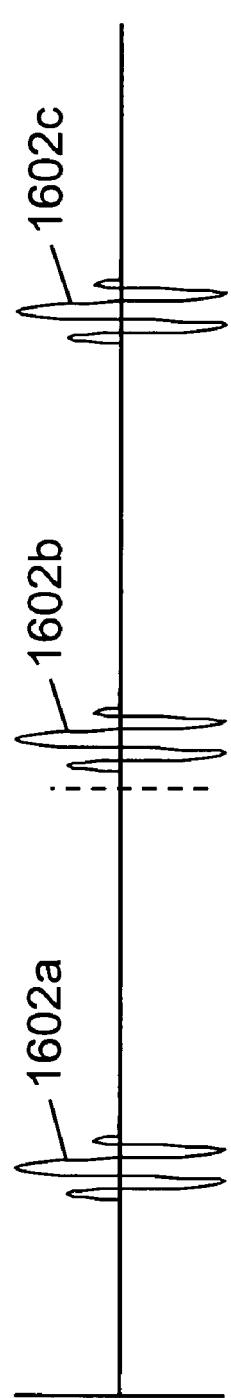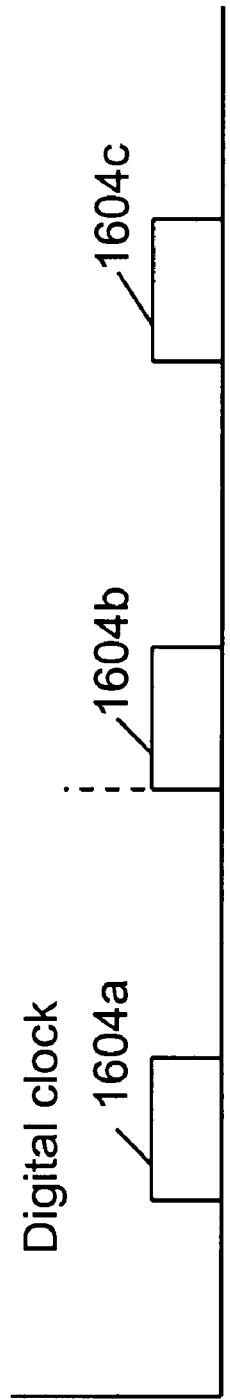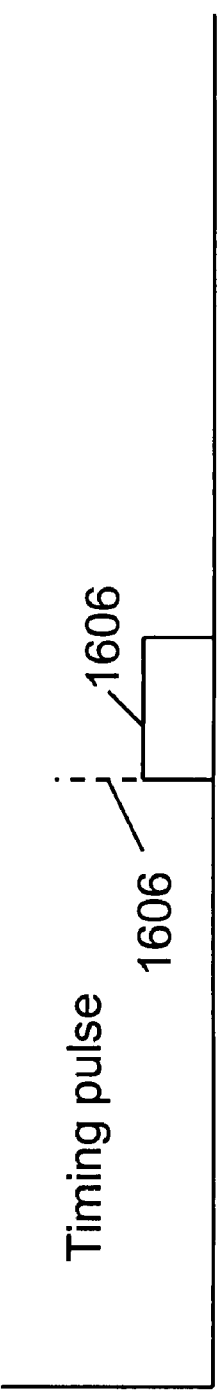

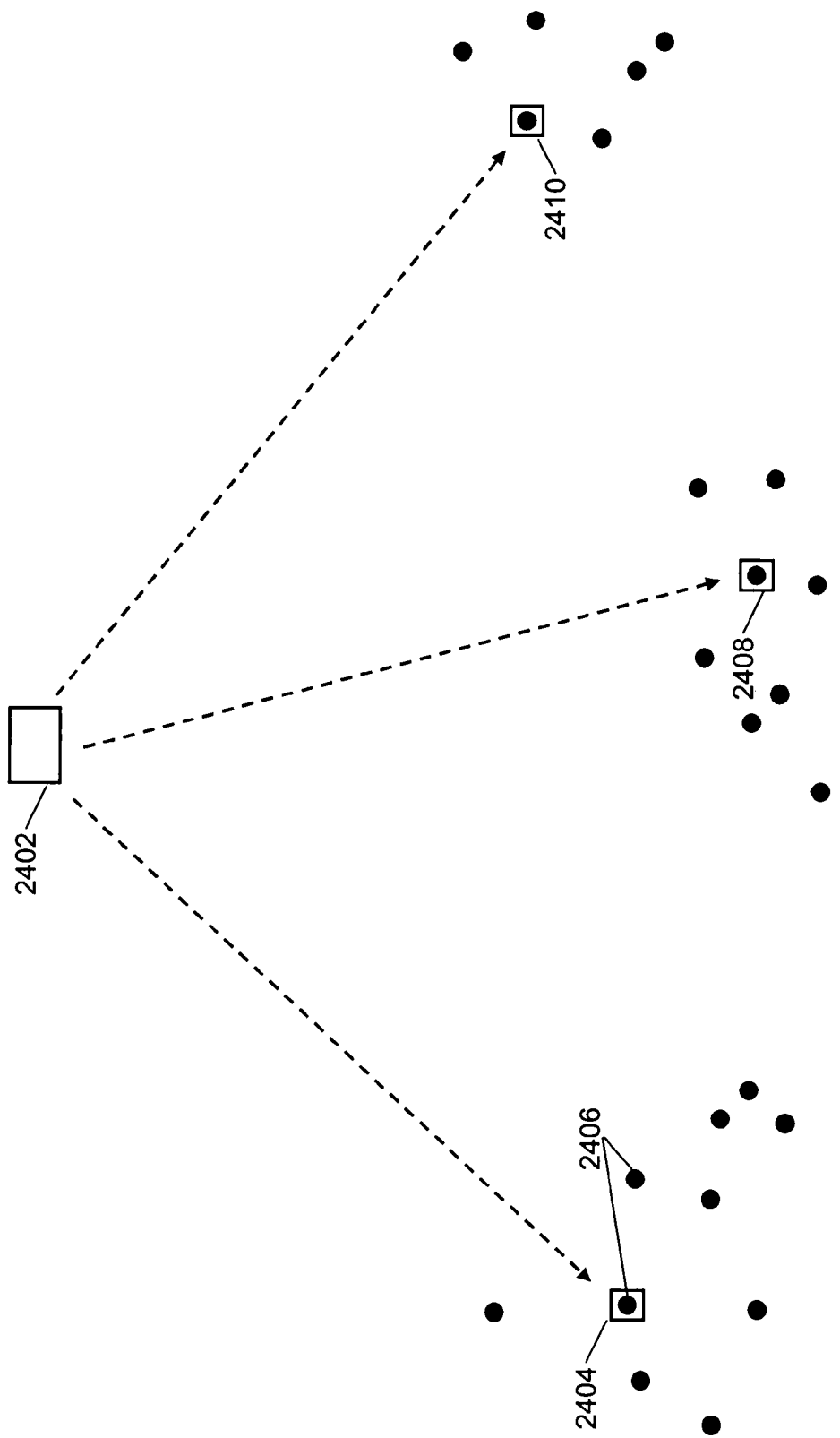

TIME TRANSFER USING ULTRA WIDEBAND SIGNALS

CROSS-REFERENCE TO RELATED APPLICATIONS

This application is a continuation of U.S. patent application Ser. No. 11/140,535, filed May 28, 2005, which is a continuation-in-part of U.S. patent application Ser. No. 10/806,131, filed Mar. 23, 2004, which is a continuation of U.S. patent application Ser. No. 10/449,602, filed Jun. 2, 2003 (issued as U.S. Pat. No. 6,710,736), which is a continuation of U.S. patent application Ser. No. 10/131,598, filed Apr. 25, 2002 (issued as U.S. Pat. No. 6,573,857), which is a continuation of U.S. patent application Ser. No. 09/767,131, filed Jan. 23, 2001 (issued as U.S. Pat. No. 6,400,307), which is a continuation of U.S. application Ser. No. 09/332,502, filed Jun. 14, 1999 (issued as U.S. Pat. No. 6,177,903). This application is related to U.S. patent application Ser. No. 09/332,503, filed Jun. 14, 1999 (issued as U.S. Pat. No. 6,218,979), entitled "Wide Area Time Domain Radar Array" and U.S. patent application Ser. No. 09/332,501, filed Jun. 14, 1999 (issued as U.S. Pat. No. 6,539,213), entitled "System and Method for Impulse Radio Power Control".

All of the patents and patent applications listed above are incorporated herein by reference.

BACKGROUND

1. Field of the Invention

The present invention pertains generally to the field of precision time transfer, more particularly to the field of time transfer by electromagnetic signals.

2. Background of the Invention

Accurate time, traceable to a standard, has been a challenge and objective through the ages. In each age, as timekeeping becomes more accurate, more and more uses are found for the more accurate time keeping. In early times, time keeping was only used to arrange meetings to minimize lost productivity as people were assembled. As time keeping advanced, time could be used to help determine longitude for seagoing ships and for recording and measuring astronomical events. As civilization advanced, time zones were established to simplify train scheduling and coordinate commerce at multiple locations now linked by high speed transportation and communications. In modern times, precision time accurate to milliseconds or better is used to coordinate events and measurements. For example, in a missile test, the precision comparison of the timing of events and measurements on board the missile with ground based radar and optical observation is critical to the evaluation of missile performance and the determination of faults and errors needed for system development.

Precision timing also finds use in coordination of data from widely separated radio telescopes, enabling much finer resolution and image detail. Before GPS, the National Institute of Standards and Technology (NIST) (then, NBS) operated WWV, WWVL, short wave and long wave time and frequency standards that are still operating and still in use by many systems. Precision time has also been transmitted over TV network systems using horizontal sync and color subcarrier signals. Recently, GPS has been developed to provide accurate time transfer as well as position measurement. Basic accuracy may be 100 ns or better with differential capability to 1 ns or better for the high performance systems.

With the availability of higher precision time, applications are finding more uses and demanding greater accuracy in time measurements and timing comparisons. Sporting events, for years, were happy with tenth of a second resolution in stop watches. Then hundredths of a second became available. Now some events are decided by milliseconds and there is talk of 100 microseconds.

Thus, there exists a present and future need for ever more precise and accurate time transfer and time measurement by simpler and more economical devices that can serve consumer and commercial applications.

BRIEF DESCRIPTION OF THE INVENTION

Briefly, time is transferred from an ultra wideband (UWB) transmitter to UWB receiver by transmitting a signal structure having an associated timing reference point together with a time value for the timing reference point. The UWB receiver receives the timing signal structure by synchronizing a receiver time base to the signal structure, demodulating the time value information, and using the demodulated time value information to set a receiver clock value. Propagation delay information is used to adjust the receiver clock value by advancing the receiver clock value to account for the propagation delay. In one embodiment, propagation delay is determined from a known distance between the transmitter and receiver. In another embodiment, the transmitter and receiver are part of a two-way link wherein propagation delay is measured by round trip timing measurements.

The synchronizing step may include a leading edge algorithm to determine the shortest delay path in a multipath environment. Alternatively, the measurement of separation distance between the transmitter and receiver is accomplished by external means such as survey or GPS. In another embodiment, the separation distance is determined using a full duplex UWB link.

In a further embodiment based on a first transceiver TRX1 and a second transceiver TRX2, the synchronizing step may comprise the step of comparing the multipath pattern resulting from transmitting from TRX1 to TRX2 with the multipath pattern resulting from transmitting from TRX2 to TRX1 to establish round trip timing and determine propagation delay.

System delays may be calibrated to remove fixed offsets from timing measurements. Delay calibration may be made with reference to an external reflector or an internal reflector such as an internal delay line or the transmitting antenna itself. In another embodiment, radar range may be used to determine distance and delay time. One end of a link may include a reflective tag for distance and delay determination.

Acquisition of the timing signal is improved by using a short code, which may repeat over the transmit-receive interval, together with a long code which does not repeat over the transmit-receive interval. In one embodiment, a portion of the short codes is replaced by a plurality of alternate codes. In another embodiment, pseudo random spacing is introduced between the short codes. In another embodiment, the code length is varied according to a pseudo random process.

A code word timer concept is disclosed that allows arbitrary selection of integration time for fast acquisition of strong signals while allowing long integration for weak signals.

Timing network architectures are disclosed. In one embodiment, a beacon transmitter transmits to a plurality of receivers. In another embodiment, a plurality of synchronized transmitters transmit to a single receiver. In another embodiment timing is relayed over a network. In another embodiment, timing is used to coordinate an array of radars.

The precision timing process is applied to a number of applications including but not limited to the monitoring of sporting events to determine the winner and to determine intermediate player positions, factory automation, robotics, gaming, antenna array beam forming, security system range enhancement, simulation and test environment timing.

In one embodiment a crystal clock is used to provide precision stable range information. In another embodiment, a range locked loop is disclosed that does not need a precision clock.

BRIEF DESCRIPTION OF THE FIGURES

The present invention is described with reference to the accompanying drawings. In the drawings, like reference numbers indicate identical or functionally similar elements. Additionally, the left most digit(s) of a reference number identifies the drawing in which the reference number first appears.

FIG. 5A-FIG. 5E illustrate an exemplary correlation matching process applied to multipath pattern matching for timing transfer.

FIG. 8A-FIG. 8J illustrate the timing of an exemplary full duplex timing transfer link incorporating antenna reflection calibration in accordance with the present invention.

FIG. 9A-FIG. 9D illustrates the timing of an exemplary time transfer link where both TRX1 and TRX2 transmit at the same time.

FIG. 10A-FIG. 10D illustrates the timing of a time transfer system where the arrival time of the return pulse at TRX1 is the same as the transmit time for TRX1.

FIG. 11A and FIG. 11B illustrate potential codes for use in time transfer.

FIG. 16, comprising FIG. 16A-FIG. 16C, illustrates the relationship among several of the waveforms that may be used in the systems of FIG. 14 and FIG. 15.

FIG. 24 illustrates an extended time reference architecture involving multiple GPS receivers each surrounded by UWB radios.

DETAILED DESCRIPTION OF THE PREFERRED EMBODIMENTS

UWB Basics

Figure 1:
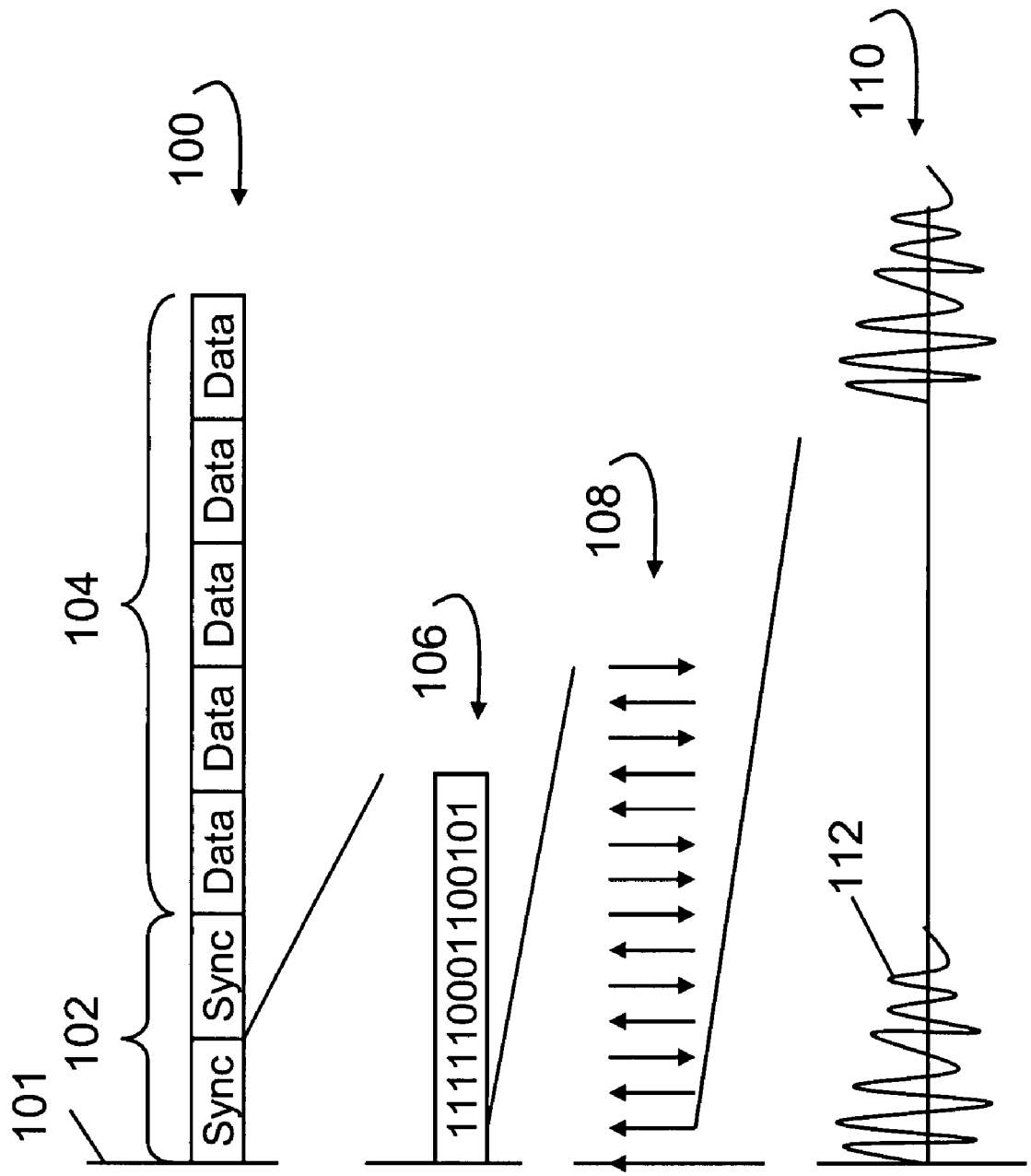
FIG. 1A-FIG. 1D illustrate an exemplary signal structure in accordance with the present invention.

The following is an overview of impulse radio as an aid in understanding the benefits of the present invention.

Ultra Wideband is an emerging RF technology with significant benefits in communications, radar, positioning and sensing applications. In 2002, the Federal Communications Commission (FCC) recognized these potential benefits to the consumer and issued the first rulemaking enabling the commercial sale and use of products based on Ultra Wideband technology in the United States of America. The FCC adopted a definition of Ultra Wideband to be a signal that occupies a fractional bandwidth of at least 0.25, or 400 MHz bandwidth at any center frequency. The fractional bandwidth is more precisely defined as:

$$FBW = \frac{2(f_h - f_l)}{f_h + f_l},$$

where FBW is the fractional bandwidth, $f_h$ is the upper band edge and $f_l$ is the lower band edge, the band edges being defined as the 10 dB down point in spectral density.

There are many approaches to UWB including impulse radio, direct sequence CDMA, ultra wideband noise radio, direct modulation of ultra high-speed data, and other methods. The present invention has its origin in ultra wideband impulse radio and will have significant application there, but it has potential benefit and application beyond impulse radio to other forms of ultra wideband and beyond ultra wideband to conventional radio systems as well. Nonetheless, it is useful to describe the invention in relation to impulse radio to understand the basics and then expand the description to the extensions of the technology.

Impulse radio has been described in a series of patents, including U.S. Pat. Nos. 4,641,317 (issued Feb. 3, 1987), U.S. Pat. No. 4,813,057 (issued Mar. 14, 1989), U.S. Pat. No. 4,979,186 (issued Dec. 18, 1990), and U.S. Pat. No. 5,363,108 (issued Nov. 8, 1994) to Larry W. Fullerton. A second generation of impulse radio patents includes U.S. Pat. Nos. 5,677,927 (issued Oct. 14, 1997), 5,687,169 (issued Nov. 11, 1997), 5,764,696 (issued Jun. 9, 1998), U.S. Pat. No. 5,832,035 (issued Nov. 3, 1998), and U.S. Pat. No. 5,969,663 (issued Oct. 19, 1999) to Fullerton et al., and U.S. Pat. No. 5,812,081 (issued Sep. 22, 1998), and U.S. Pat. No. 5,952,956 (issued Sep. 14, 1999) to Fullerton, which are incorporated herein by reference.

Uses of impulse radio systems are described in U.S. Pat. No. 6,177,903 (issued Jan. 23, 2001) titled, "System and Method for Intrusion Detection using a Time Domain Radar Array", U.S. Pat. No. 6,218,979 (issued Apr. 17, 2001) titled "Wide Area Time Domain Radar Array", and U.S. Pat. No. 6,614,384 (issued Sep. 2, 2003), which are incorporated herein by reference.

Additional details on pulser circuits may be found in U.S. patent application Ser. No. 09/537,692 Titled: "Apparatus, System and Method for Flip Modulation in an Impulse Radio Communications System," filed Mar. 29, 2000, by Fullerton et al., and application Ser. No. 10/712,271 titled: "A Bi-Phase Modulator for Ultra Wideband Signals", filed Sep. 30, 2004, by Fitzpatrick et al., which are incorporated herein by reference.

Additional details on receiver circuits may be found in U.S. Pat. No. 6,421,389 titled "Baseband Signal Converter Device for a Wideband Impulse Radio Receiver" issued Jul. 16, 2002 to Jett et al. Further UWB power saving techniques may be found in U.S. Pat. No. 6,492,904 titled "Method and system for coordinating timing among ultrawideband transmissions" issued Dec. 10, 2002 to Richards, and U.S. Pat. No. 6,571,089 titled: "Method and apparatus for moderating interference while effecting impulse radio wireless control of equipment," issued May 27, 2003 to Richards et al. and US patent application titled: "System And Method For Processing Signals In UWB Communications," Ser. No. 10/712,269, filed on 14 Nov. 2003 by Brethour et al. All of the above cited US patents and US patent applications are hereby incorporated herein by reference in their entirety.

Timing coordination among UWB transmissions is further described in U.S. Pat. No. 6,492,904, titled: "Method and System for Coordinating Timing Among Ultrawideband Transmissions," issued Dec. 10, 2002 to Richards. Security systems utilizing timing are further described in U.S. Pat. No. 6,614,384, titled: "System and Method for Detecting an Intruder Using Impulse Radio Technology," issued Sep. 2, 2003 to Hall et al. and U.S. Pat. No. 6,177,903, titled: "System and Method for Intrusion Detection Using a Time Domain Radar Array," issued Jan. 23, 2001 to Fullerton et al. Object position location is further explained in U.S. Pat. No. 6,300,903, titled: "System and Method for Person or Object Position Location Utilizing Impulse Radio," issued Oct. 9, 2001, to Richards et al. Position determination is further explained in U.S. Pat. No. 6,133,876, titled: "System and Method for Position Determination by Impulse Radio," issued Oct. 17, 2000 to Fullerton et al. Functional control based on position information is further described in U.S. patent application Ser. No. 09/511,991, titled "System and Method for Information Assimilation and Functionality Control Based on Positioning Information Obtained by Impulse Radio Techniques," filed Feb. 24, 2000 by Taylor et al. Delay coding techniques are further described in U.S. patent application Ser. No. 09/878,923, titled: "System and Method for Applying Delay Codes to Pulse Train Signals," filed Jun. 13, 2001 by Roberts and U.S. Pat. No. 6,878,730 titled "Method and apparatus for applying codes having pre-defined properties," issued Sep. 7, 2004 to Richards et al. The above listed US patents and US patent applications are hereby incorporated herein by reference in their entirety.

Distance measurement is further described in U.S. Pat. No. 6,133,876 Titled: "System and Method for Position Determination By Impulse Radio," issued Oct. 17, 2000 to Fullerton et al, and U.S. Pat. No. 6,295,019 Titled: "System and Method for Distance Measurement by Inphase and Quadrature Signals in a Radio System" issued Sep. 25, 2001 to Richards et al.

Full duplex communications is further described in U.S. Pat. No. 5,687,169, titled "Full Duplex Ultrawide-Band Communication System and Method," issued Nov. 11, 1997 to Fullerton.

Precision timing generators are further described in U.S. Pat. No. 6,304,623 titled "Precision Timing Generator System and Method," issued Oct. 16, 2001 to Richards et al., and U.S. Pat. No. 6,577,691 titled "Precision timing generator apparatus and associated methods," issued Jun. 10, 2003 to Richards et al.

Acquisition is further described in U.S. Pat. No. 6,556,621 titled "System for Fast Lock and Acquisition of Ultra-Wideband Signals," issued Apr. 29, 2003 to Richards et al.

All of the above mentioned US patents and patent applications are hereby incorporated herein by reference in their entirety.

Timing Transfer Using Ultra Wideband Signals

In accordance with the present invention, timing is transferred between a transmitter and a receiver by sending timing information keyed and synchronized to UWB signal characteristics such that timing may be unambiguously identified in the received signal in spite of multipath or other signal distortions. The same UWB signals may also be utilized to measure propagation delay to trace the timing origin to the transmitter frame.

During the course of transmitting and receiving the signal, timing ambiguities and errors arise from numerous sources. These sources include circuit delays, filters, multipath, path length wrap around, pulse distortion, pulse cycle uncertainty, code side lobe response and other sources that depend on signal and system architecture. Thus, the present invention resolves ambiguities in a unified hierarchical synchronization architecture that insures unambiguous timing synchronization at all time intervals. This is achieved by resolving ambiguities at the pulse level, code level, data level, and message level while providing circuit delay self calibration and compensation.

FIG. 1A-FIG. 1D illustrate an exemplary signal structure in accordance with the present invention. Referring to FIG. 1A, the signal structure 100 comprises a synchronizing pattern 102 and a data stream 104. The data stream 104 contains a time value that identifies the time associated with a time reference point 101 in the signal. The time reference point 101 may be the time of the first pulse in the immediately preceding synchronization pattern 102 as illustrated, however, any suitable time reference point may be selected. Once selected, the time reference point 101 is defined as part of the signal structure 100 or protocol and known to all systems using the signal structure 100. FIG. 1B illustrates a first word 106 of an exemplary data synchronizing pattern. The synchronization pattern and data may be organized into bytes or words as appropriate.

FIG. 1C illustrates an exemplary data bit 108 further comprising a plurality of pulses indicated by arrows, each pulse polarity modulated in accordance with an exemplary code, the polarity of each pulse indicated by the up/down direction of the arrow. Any code or modulation method may be chosen. Polarity pulse modulation is shown in exemplary FIG. 1C. A typical receiver samples and integrates a sequence of pulses to determine the value of the data bit 108. FIG. 1D illustrates an exemplary pulse train 110 (two pulses shown) including an exemplary pulse waveform 112 for a received pulse in a multipath environment. The precise timing of a multipath response waveform relative to the original transmitted pulse is not immediately clear due to the multiple cycles of the unknown multipath signal structure. The multipath signal structure typically varies with the environment and may change rapidly in a mobile or portable application. Timing resolution with respect to each of the signal structure components of FIGS. 1A-1D together with propagation delay and system delay measurements will be discussed, each in turn, in greater detail in the following disclosure.

Resolving Ambiguities

The system, in accordance with the present invention, mitigates ambiguities in timing by using one or more of the following strategies: non-repetitive coding, ultra wideband signal properties, multipath algorithms, data patterns, and delay calibration techniques. Each strategy addresses a specific time scale or signal property. Ultra wideband signals are used to provide precise timing to the smallest time scales and to enable resolution of a specific RF cycle to enable sub RF cycle timing resolution. First arriving pulse and multipath pattern matching enable accurate delay measurements in the presence of multipath in the environment. Coding is used to synchronize timing on a time scale commensurate with the code length. Coding, however, leaves timing ambiguities equal to the code repeat length. Code modulation or variation extends timing ambiguities to greater lengths. Data modulation, used with data synchronization and timing data eliminates coding ambiguities and enables tracing time to a unique start time in history. Calibration techniques, using various references including internal references and external references, allow for accurate measurements by removing device and temperature variations.

Pulse Timing

Timing is initially resolved to the interval of a UWB pulse by acquiring and locking on the pulse train signal. Systems and methods for pulse train acquisition and tracking may be found in U.S. Pat. Nos. 5,832,035 and 6,556,621 previously incorporated by reference above. A typical UWB pulse may comprise only a few RF cycles. For example, a 3 GHz center frequency UWB pulse with a bandwidth of 1 GHz may have only about three significant RF cycles. A typical UWB acquisition process will lock on one of these cycles resulting in a synchronization error of less than a fraction of a nanosecond. Once the receiver is locked on the signal, a correction may be made for propagation delay based on known distance or measured delay. Thus, a pulsed UWB system can achieve timing synchronization to a fraction of a nanosecond by acquiring and locking on a UWB pulse train, and then correcting for propagation delay.

For many systems acquiring and locking is the first step. Further features of the invention described herein offer finer resolution, higher reliability, and better performance in multipath.

RF Cycle

Once acquisition is achieved, timing of the received pulse waveform may be further resolved to the precise RF cycle and potentially to the phase within the RF cycle. As such, timing synchronization accuracy within tens of picoseconds can be achieved with careful system design. In one embodiment, a scanning receiver architecture is used to scan the received signal and determine the peak cycle of the pulse. Scanning receiver techniques may be better understood with reference to U.S. patent application Ser. No. 10/712,269, which has been incorporated herein by reference. Briefly, a scanning receiver receives a signal at a set of sequential time offset values. The set of sequential signal strength values received comprises a "scan," which may then be processed to determine signal characteristics such as peak, or leading edge, or other properties. The system can then lock on the peak cycle of the pulse for consistent timing resolved to a single cycle. If a correlating or sampling receiver is used to lock on the signal, the phase of the lock will be stable because the correlating or sampling processes are inherently phase sensitive. The resulting system may then operate with resolution and precision to a fraction of a wavelength of the UWB signal.

Alternatively, RF cycle synchronization may be achieved by using a first arriving pulse, or leading edge algorithm similar to algorithms known for distance measurement, however, the performance criteria and potential methodology may be different for timing measurement. For timing measurement, a consistent delay measurement may be the objective, which may be along any path, i.e., knowledge of the first arriving pulse may not always be needed as long as the timing can be measured, and later arriving pulses may provide better signal strength than the first arriving pulse. Further details on cycle synchronization algorithms will be described later. Details on first arriving pulse algorithms used in distance measurement may be found in U.S. Pat. No. 6,762,712 (issued Jul. 13, 2004) and U.S. patent application Ser. No. 09/915,620 (filed Jul. 26, 2001), which are incorporated herein by reference.

A particular RF cycle may be identified for timing measurement by using leading edge algorithms that detect the first arriving pulse in a multipath environment. The first arriving pulse may be found by scanning the signal space and setting a threshold based on background signal, maximum signal, and/or signal correlation.

Figure 2:
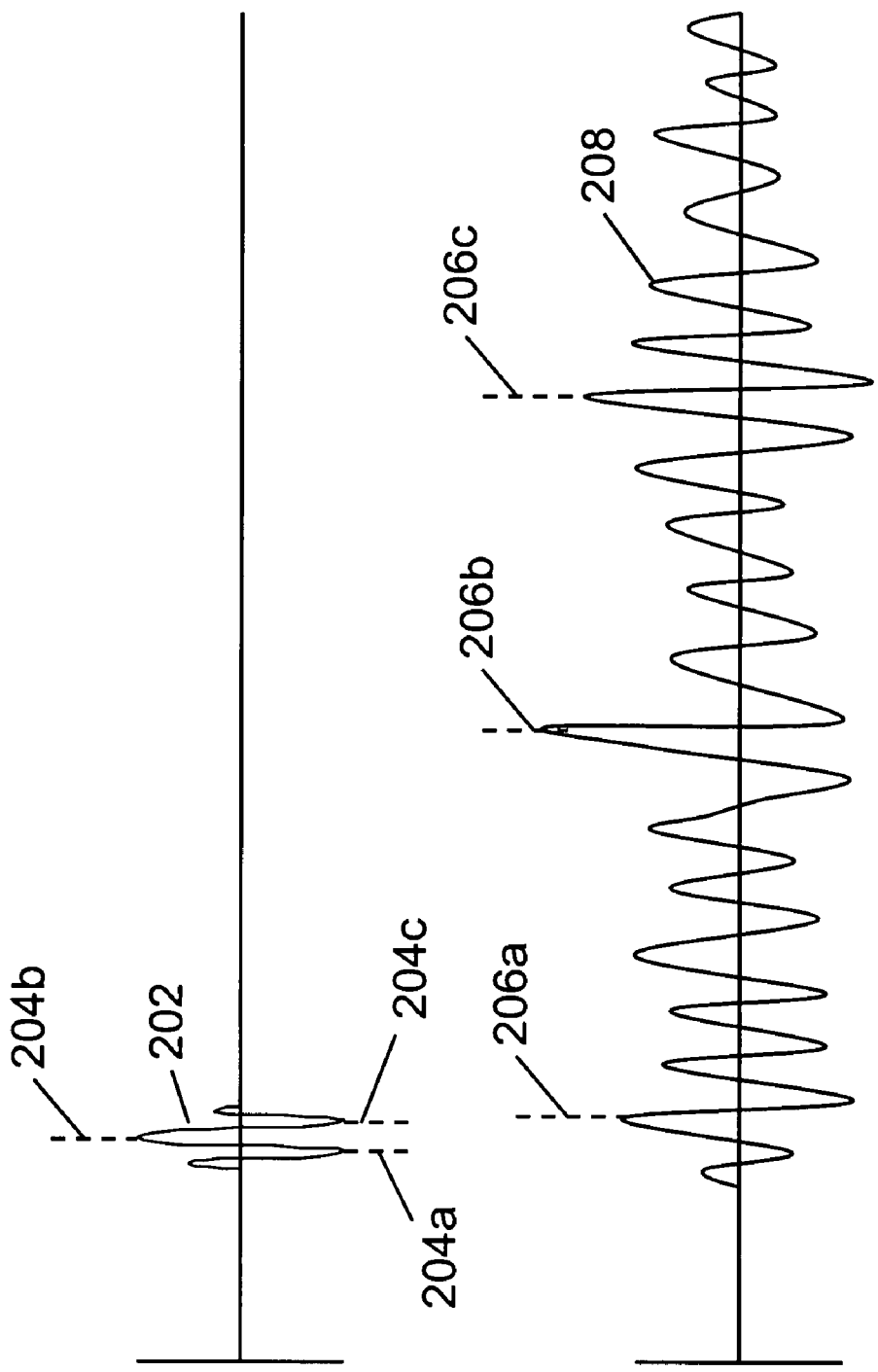
FIG. 2A and FIG. 2B illustrate two exemplary received waveforms together with potential tracking points.

FIG. 2A and FIG. 2B illustrate two exemplary received waveforms together with potential tracking points. FIG. 2A illustrates a single UWB pulse in the absence of multipath. FIG. 2B illustrates a composite signal comprising many multipath reflections resulting from a single transmitted pulse. Referring to FIG. 2A, a single UWB pulse may have several lobes 204a, 204b, and 204c with sufficient energy to acquire and track the signal. Unless the acquisition carefully accounts for the precise location of track relative to the signal, timing ambiguities may result. Referring to FIG. 2B, for a signal in multipath 208, the time of peak signal strength 206b may occur substantially delayed from the time of the first arriving pulse 206a. Still other strong signal tracking opportunities may be found at other delays such as the peak at 206c.

One method for mitigating the multiple tracking point issue is to utilize a scanning receiver to capture the received waveform data and then analyze the waveform to determine a selected tracking time offset and then move the receiver timer to that time offset to track the signal. In one embodiment, the selected tracking time is determined from the greatest signal peak or greatest peak to peak swing. (Signals are typically tracked using the slope rather than the peak.)

Figure 3:
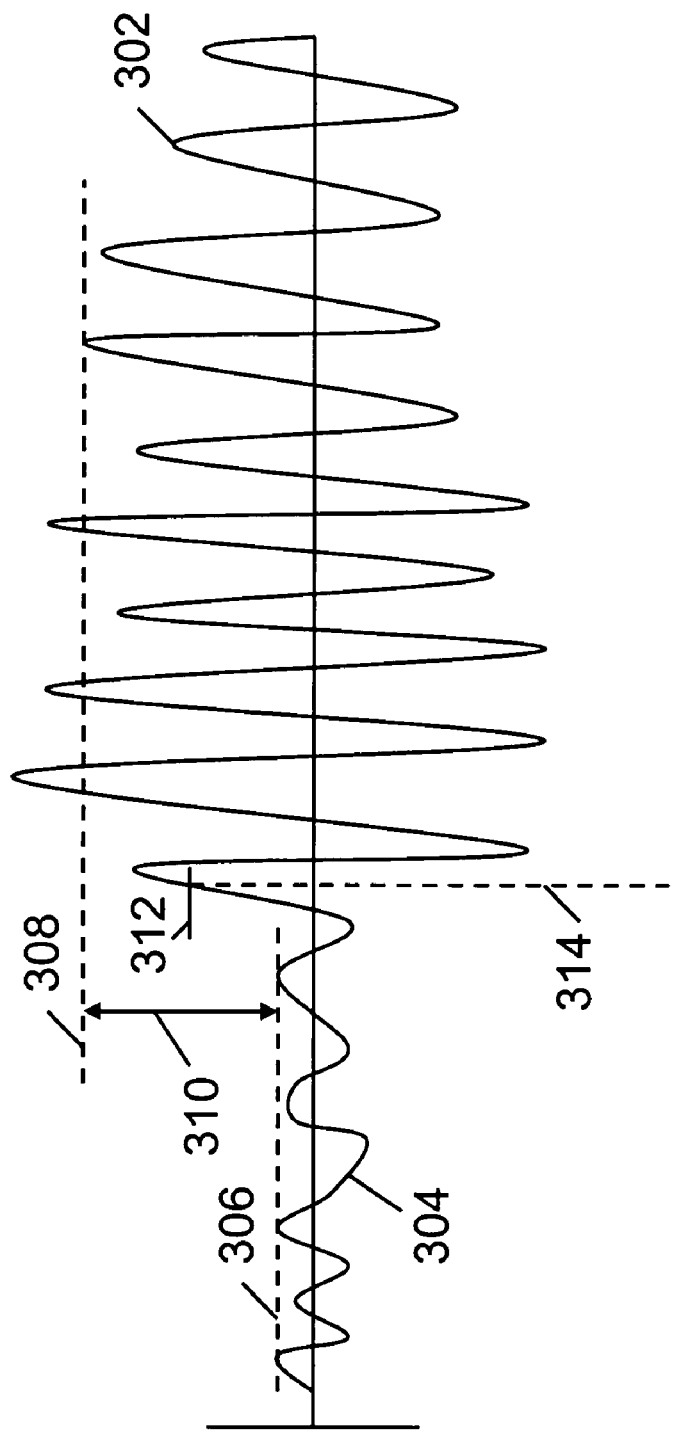
FIG. 3 illustrates the leading edge region of a received signal from a transmitted UWB pulse in a multipath environment.

In another embodiment, the selected signal feature for tracking is determined from the first arriving pulse (alternatively called leading edge) of the received waveform. FIG. 3 illustrates the leading edge region of a received signal from a transmitted UWB pulse in a multipath environment. The waveform of FIG. 3 may be generated by a scanning receiver measuring the signal strength from a range of time offsets comprising the time axis range of FIG. 3. Referring to FIG. 3, a received multipath signal 302 is shown rising out of background noise 304. The leading edge may be determined by using one of a number of criteria. The leading edge may be taken as the time when the signal exceeds some factor, for example five, times the RMS background noise value 306. Alternatively, the leading edge may be found as some factor, for example half, of the difference between the RMS noise level 306 and the RMS signal level 308. Alternatively, the leading edge may be found as some factor, for example half, of the peak signal level, ignoring noise levels. Other criteria may be used for detecting the leading edge. The leading edge and the related first arriving pulse are particularly valuable for timing architectures that involve delay correction based on a known distance measurement or for the distance measurement itself. The delay to the leading edge represents the straight-line distance between a transmitter and receiver (corrected for cable delays, etc.) Thus, a measured distance may be used to calculate the delay to the leading edge, enabling timing transfer without two-way communications to measure the delay. The timing transfer process first identifies the timing of a particular pulse in the pulse train and then adjusts the timing for propagation delay. First arriving pulse algorithms allow for the identification of the pulse location within the multipath signal so that propagation delay may be used to relate the pulse timing to the source transmitter timing frame. Propagation delay may be determined by independent measurement as from survey or laser ranger, or may be determined by round trip UWB signal delay using first arriving pulse algorithms on each end of the link. When a measured distance is used in combination with a first arriving pulse algorithm, timing transfer may be accomplished with a single transmitter and receiver link.

First arriving pulse information, however, is not essential to timing transfer. In a system with two-way communications, multipath pattern matching may be used to determine delay irrespective of the leading edge, or first arriving pulse. Since two transceivers communicating with one another use the same path, the reflections will be the same in both directions. If the two transceivers have the same pulse shape and same receiver pulse processing, the multipath response patterns will be the same. By pattern matching, the multipath response pattern may be used to determine path delay. Thus, any signal path through any reflection or group of reflections may be used to determine the delay that is used to relate the receiver timing frame to the transmitter timing frame. Thus, a signal peak, such as peak 206b in FIG. 2B may be used to measure transmit-receive delay time. Using round trip timing with pattern matching allows the use of the strongest reflection or the combining of multiple reflections to determine propagation delay and does not require line of sight communications.

Figure 4:
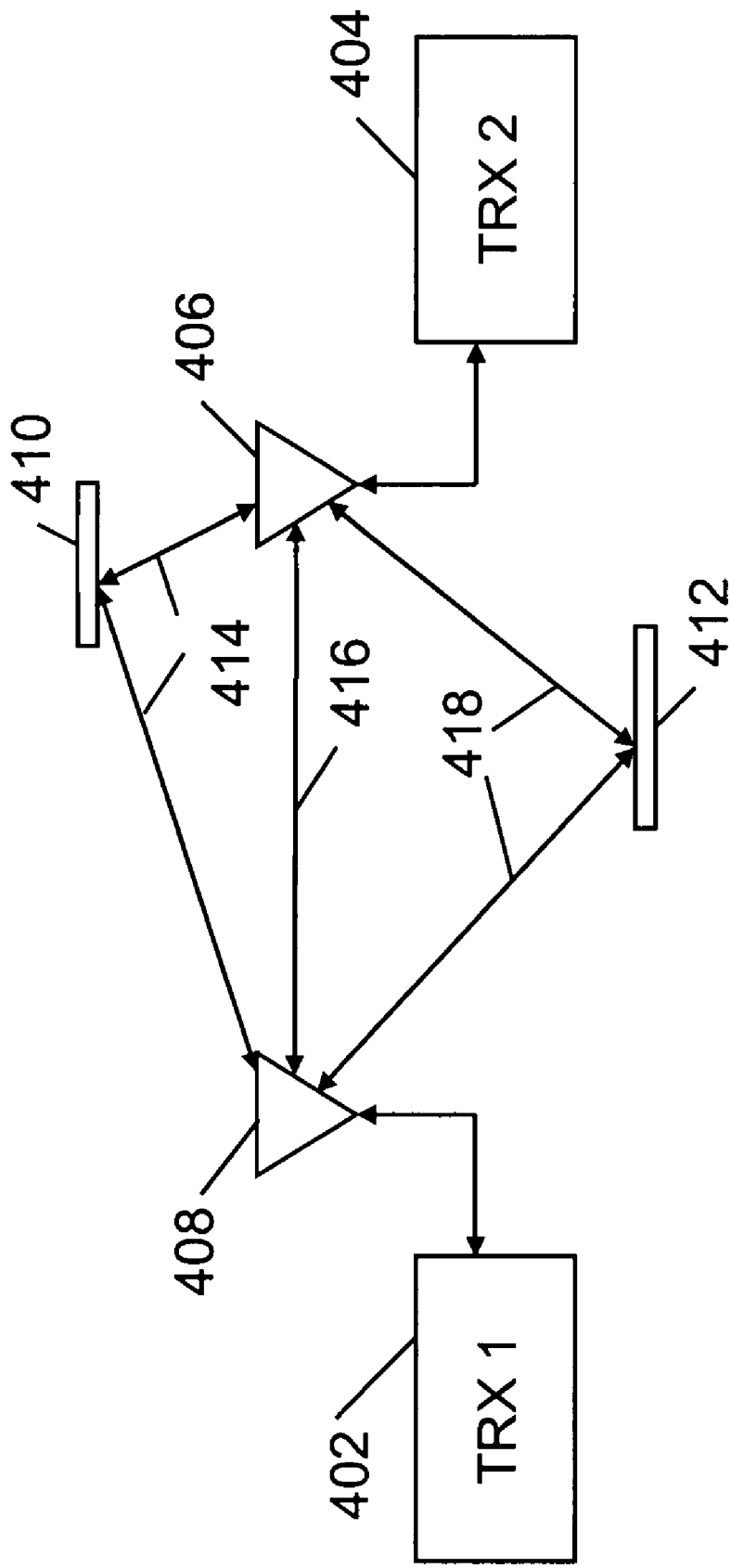
FIG. 4 illustrates an exemplary two way communication link in multipath.

Timing transfer with two-way measurement of multipath will now be described with reference to FIG. 4. FIG. 4 illustrates an exemplary two-way communication link between a first transceiver TRX1 402 and a second transceiver TRX2 404 in a multipath environment generated by two reflectors 410 and 412. FIG. 4 illustrates a direct path 416 and two multipath reflections 414 and 418. It can be seen that the distance, and thus, the delay is the same, whether traversing from TRX1 402 to TRX2 404 or from TRX2 404 to TRX1 402. Since most reflectors are linear, the coupling (amplitude) is the same as well. Thus, the multipath pattern generated in one direction is the same as the multipath pattern generated in the opposite direction.

The two-way measurement process utilizes the property that the two-way link includes the same reflections and results in the same multipath pattern in each direction. By comparing multipath patterns from each direction, signal delays may be accurately determined. The multipath pattern matching may be combined with a full duplex link described later. The full duplex link provides two-way communications and round trip timing to allow determination of propagation delay once a signal match is determined. Correlation matching may be better understood with reference to FIG. 5.

FIG. 5A-FIG. 5E illustrate an exemplary correlation matching process applied to multipath pattern matching for timing transfer. FIG. 5A illustrates an exemplary first received scan 502 of a received signal relative to an associated first receiver timing reference 504. The first received scan 502 results from transmission from TRX1 402 to TRX2 404. FIG. 5B through 5D illustrate three of many timing offsets of a second received scan 508a-508c. The second received scan results from transmission from TRX 2 to TRX 1 and includes a timer reference 506a-506c relative to the time base of TRX 1. One transceiver may typically perform a scan and send the resulting scan data to the other transceiver, which performs the correlation matching calculation. FIG. 5B shows the second multipath pattern shifted early (508a) relative to the first multipath pattern 502. FIG. 5C shows the second multipath pattern in synchronization (508b) with the first multipath pattern. FIG. 5D shows the second multipath pattern shifted later in time (508c) relative to the time of the first multipath pattern 502. For each shift of the second multipath pattern, the two patterns (502 and 508) are multiplied point by corresponding point and the multiply results integrated to yield a correlation result. The set of correlation results from a sequence of time shifts is a correlation matching function. FIG. 5E illustrates an exemplary correlation matching function 512 resulting from point by point multiplying and integrating the scan of FIG. 5A with multiple respective shifted versions of the second scan (including 508a, 508b and 508c). The peak of the correlation matching function represents the best match and the time of the peak 506b identifies the point by point signal correspondence for use in comparing time bases. The time difference 510 between time bases at best match represents the timer offset from TRX1 402 to TRX2 404.

The time difference 510 determined by signal correspondence may be combined with receive to transmit delay in the first transceiver and second transceiver to determine a total link round trip delay. Propagation delay may then be determined by subtracting known fixed system delays.

As may be appreciated by one skilled in the art, other pattern matching algorithms may be used and the matching calculation may be performed at the first transceiver or second transceiver or another processor receiving the information necessary for calculation via a network or other communication link.

Full Duplex Link for Measuring Propagation Delay

Figure 6A:
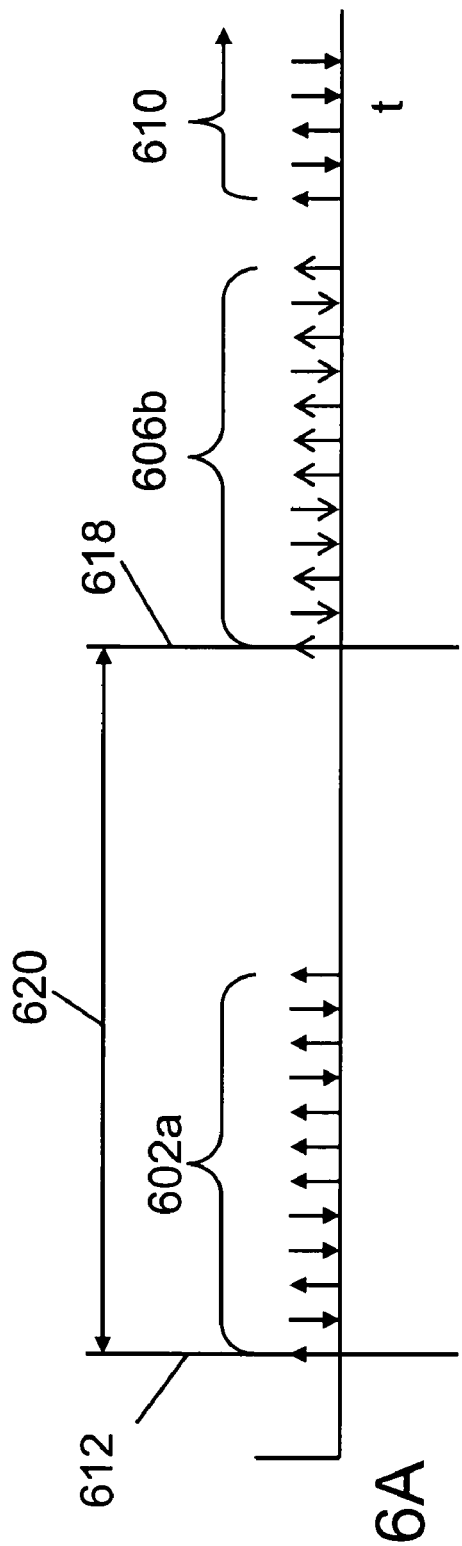
FIG. 6A and FIG. 6B illustrate an exemplary full duplex signaling sequence which may be used in the link of FIG. 4.
Figure 6B:
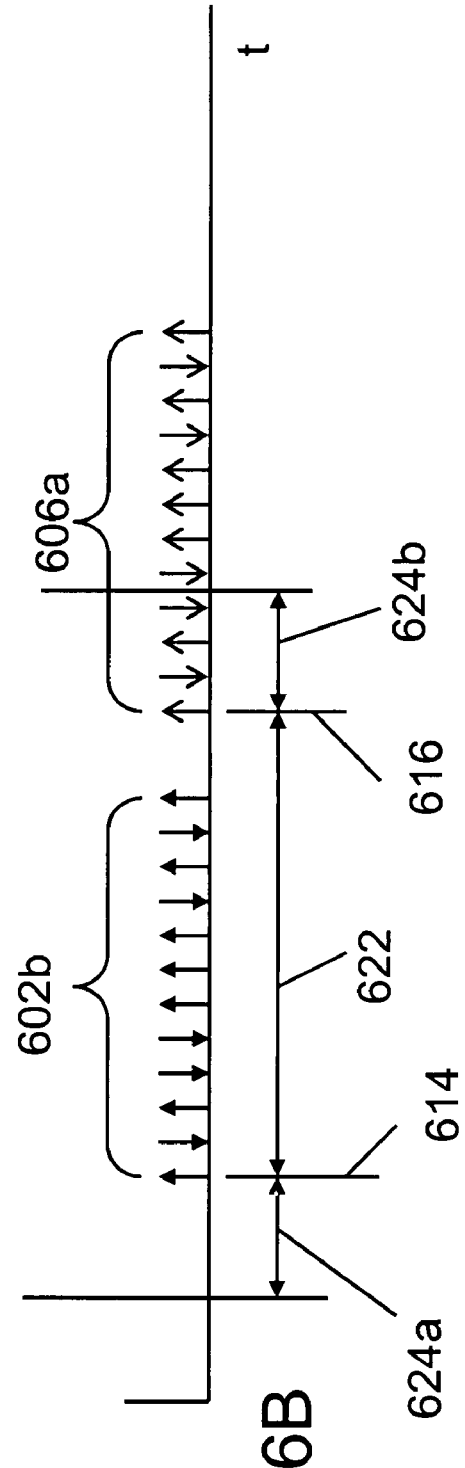

FIG. 6A and FIG. 6B illustrate an exemplary full duplex signaling sequence which may be used in the link of FIG. 4. FIG. 6A illustrates the signals transmitted and received at an initiating transceiver, TRX1 402. FIG. 6B illustrates the signals transmitted and received at a responding transceiver, TRX2 404. FIGS. 6A and 6B are on identical time axes for time comparison of the signals. Referring to FIGS. 6A and 6B, TRX1 402 transmits a pulse train 602a to TRX2 404. TRX2 404 receives the pulse train 602b delayed by the propagation delay 624a. TRX2 404 sends a responding pulse train 606a delayed from the reception of pulse train 602b by a turn around time 622. TRX1 402 receives the responding pulse train 606b delayed again by the propagation delay 624b. TRX1 402 may send another pulse train 610 to repeat the process. TRX1 402 may measure the time difference 620 between the transmitted pulse train and the received pulse train. In one embodiment, TRX1 402 measures the time difference between a transmit time base 612 used to generate the transmitted pulse train and a receive time base 618 used to generate template pulses. TRX2 404 sends turn around delay 622 information to TRX1 402 and TRX1 402 subtracts turn around delay 622 from total delay 620 to get round trip delay. For most systems, the one way delay 624a may be calculated as one half of the round trip delay. Special considerations may be needed if TRX1 402 and TRX2 404 are not of identical design or if separate transmit and receive antennas at different locations are used. Thus it is preferred, for simplicity, that TRX1 402 and TRX2 404 are of similar design and each use a single antenna for transmitting and receiving.

More specifically, the time delay from TRX1 402 transmit to TRX1 402 reception of the TRX2 404 signal is:

$$Tround=Tprop1+Tturn+Tprop2$$

Where,

Tround is the round trip delay 620 from the transmitted pulse 612 at TRX1 to the received signal 618 at TRX1,
Tprop1 is the propagation delay 624a from TRX1 to TRX2,
Tturn is the turn around time 622 from the received signal 614 at TRX2 to the transmitted signal 616 at TRX2,
Tprop2 is the propagation delay 624b from TRX2 to TRX1.

Determining Tround requires matching the transmit pulse time 612 to the receive pulse time 618. The matching may be problematic in multipath since the waveforms may be significantly different. However, using waveform matching, the round trip time may be found as follows.

$$Tround=Tprop1+Ttbs1+Tturn+Tprop2-Ttbs2$$

Where,

Tround is the round trip delay 620 from a transmitted pulse 612 to a received signal 618,
Tprop1 is the propagation delay 624a from TRX1 to TRX2,
Ttbs1 514 is the time from a selected point (negative peak of 502) on the signal received by TRX2 to the TRX2 time base 504,
Tturn is the turn around time 622 from the received signal at TRX2 to the transmitted signal at TRX2,
Tprop2 is the propagation delay 624b from TRX2 to TRX1,
Ttbs2 516 is the time from a corresponding point (negative peak on 508b) on the signal received by TRX1 to the TRX1 time base 506b. The Ttbs2 corresponding point corresponds to the Ttbs1 selected point according to the time delay found by the multipath matching process.

We can define a time base delta (Ttbd) as the time base difference 510 found in FIG. 5E from pattern matching.

$$Ttbd=Ttbs1-Ttbs2.$$

Thus, $$Tround=Tprop1+Tturn+Tprop2+Ttbd.$$

Since T prop1=Tprop2, $$Tprop1=Tprop2=(Tround-Tturn-Tdbase)/2.$$

Time transfer may be accomplished from TRX1 to TRX2 by transmitting a time tagged signal and correcting for propagation delay to relate the received time tagged signal to the transmitted time base. Thus, $$T1=T2+Tprop+Ttbd.$$

Where T1 is the time at TRX2 traced to the time base of TRX1, a copy of the time of TRX1,
T2 is the time base of TRX2,
Tprop is the propagation delay,
Ttbd is the time base delta found through multipath pattern matching.

Thus, time may be accurately transferred using multipath pattern matching in the absence of a direct path signal and without the knowledge of distance between the transceivers and even without the ability to determine distance.

Calibration

The disclosure to this point has treated a transceiver as having a single time base for the transmitter and receiver, or an architecture where the differences may be easily determined and accounted for, but such may not always be the case. This section discloses a calibration method to compensate for various delays in an exemplary system. The calibration process may be run once and the values stored for later use, or may be integrated into each measurement sequence.

In one embodiment fixed compensation may be determined. A system may be set up and operated in a known measured fixture where the output can be accurately verified. Any residual errors may be attributed to fixed electronic delays plus cable delays and other related fixed delays. The residual errors may then be corrected by subtracting a fixed value from the uncorrected results. The fixed value may then be stored in the system for use with future results. Fixed value correction, however, may be time consuming for volume production and may not perform well over temperature or time. Thus, a self calibration method may offer advantages and may be used in place of or in addition to fixed calibration.

Figure 7:
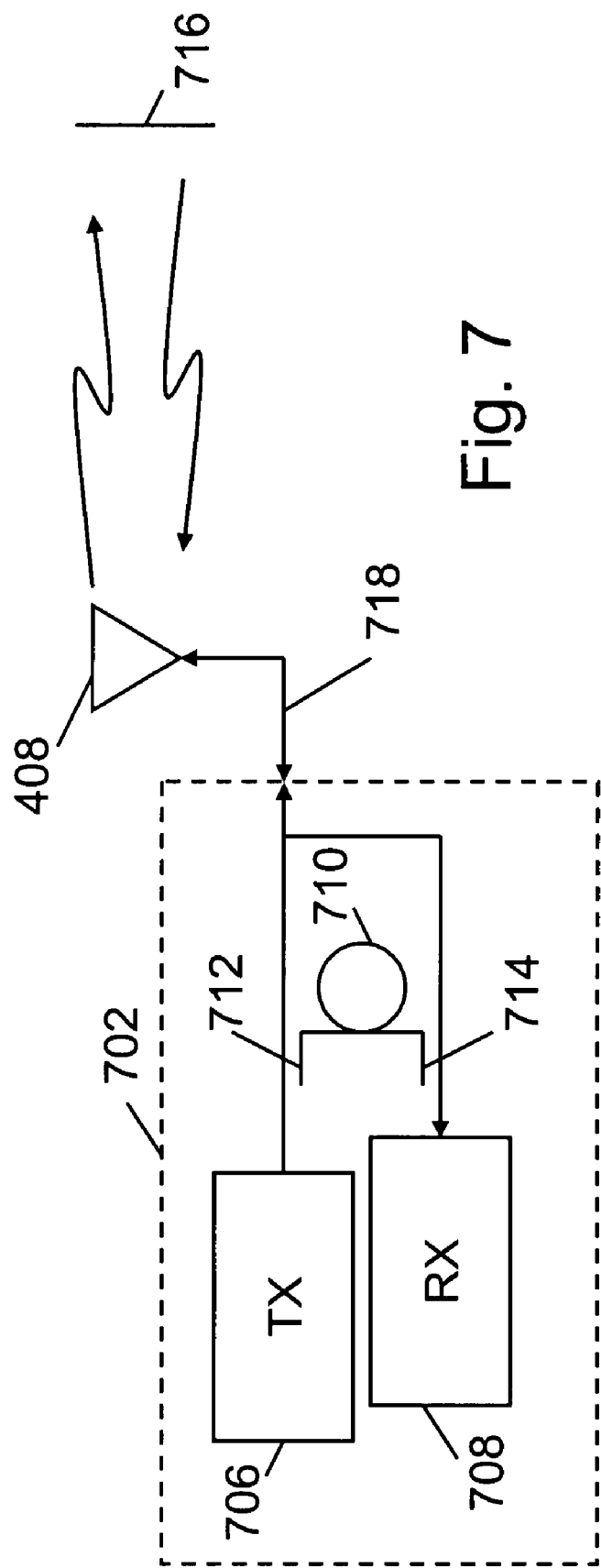
FIG. 7 illustrates an exemplary self calibration system in accordance with the present invention.

FIG. 7 illustrates an exemplary self calibration system in accordance with the present invention. Referring to FIG. 7, the exemplary transceiver 702 comprises a transmitter 706, a receiver 708, an antenna 408 and a signal feedback means. The signal feedback means may be an internal signal coupler comprising coupling from the transmitter output 712, a delay line 710 and receiver input coupling 714; or may be an external reflector 716; or may be a slight mismatch to the antenna 408 itself or to the feedline 718 to the antenna 408.

External Reflector As Reference

In one embodiment, an external reflector 716 at a measured distance is used to calibrate the system, i.e. to measure and remove static errors. The transmitter transmits a pulse train and the receiver 708 is operated as a scanning receiver to scan the reflected signal from the transmitted pulse train. First arriving pulse or signal matching (using a stored waveform pattern) may be used to find the time delay of the reflection. System delays may then be determined by subtracting a fixed delay based on the known distance to the reflector. Thus temperature variations in the overall delay will be removed because the timing to the antenna 408 will be based on a fixed delay from a known reflector 716.

Internal Delay Line As Reference

In a further embodiment, an internal delay line 710 is used to determine and compensate for internal delays. A portion of the transmitter signal is coupled through a delay line 710 to the receiver 708. The receiver 708 is operated as a scanning receiver to determine the return delay through the delay line 710. System delays may then be determined based on the calibrated delay of the delay line 710, removing temperature sensitive electronic delays from the result.

Antenna Mismatch As Reference

In another embodiment, a reflection from the slight mismatch of the antenna is used to determine the time delay to the antenna and to determine and compensate for internal delays. Broadband UWB antennas may naturally have a slight mismatch that may be utilized for calibration. The natural mismatch may, however, produce waveform distortion in the return signal, thus it may be desirable to generate a broadband reflection by resistive mismatch for waveform control. Again, the receiver 708 is operated as a scanning receiver to determine the delay to the antenna 408. Once the delay to the antenna 408 is known, the timing to the remainder of a timing network or link may be accurately determined and accurately controlled.

FIG. 8A-FIG. 8J illustrate the timing of an exemplary full duplex timing transfer link incorporating antenna reflection calibration in accordance with the present invention. FIG. 8A illustrates the timing of a pulse 804 from the pulser internal to the transmitter of TRX1. FIG. 8B illustrates a delayed pulse 806, which is the pulse 804 of FIG. 8A at the antenna of TRX1, delayed by cable delay. FIG. 8C illustrates a delayed pulse 808 which is the pulse 804 of FIG. 8A reflected from the antenna and received by the receiver of TRX1, further delayed by cable delay. FIG. 8C may be developed as a scan 808 of the signal and a timing reference 810 may be associated with the scan 808. FIG. 8D illustrates the received multipath signal 812 resulting from the pulse 804 of FIG. 8A at the antenna of TRX2. FIG. 8E illustrates the received signal 814, which is the signal of FIG. 8D at the receiver of TRX2, delayed by cable delay. FIG. 8E may be developed as a scan of the signal 814 and a timing reference 816 may be associated with the scan 814.

FIG. 8F-FIG. 8J illustrate the timing of a return transmitted pulse from the pulser internal to TRX2. The return transmitted pulse 818 may utilize a full duplex scheme such as illustrated in FIG. 6A-6B and thus may be separated in time from the signals of FIGS. 8A-8E, but may be shown in relation to the signals of FIGS. 8A-8E by displaying modulo frame time where the delay of each signal is displayed relative to a repeating frame time reference. FIG. 8G accordingly illustrates a delayed pulse 820, which is the pulse of FIG. 8F at the antenna, and FIG. 8H illustrates a further delayed pulse 822, which is the pulse of FIG. 8F reflected from the antenna of TRX2 and received at the receiver of TRX2. FIG. 8H may be developed as a scan 822 of the transmitted signal and a timing reference 824 may be determined.

FIG. 8I represents the received return pulse signal 826 at TRX1 resulting from the pulse 818 of FIG. 8F, received at the TRX1 antenna. FIG. 8J represents a delayed signal 828, which is the signal 826 of FIG. 8I at the receiver of TRX1, delayed by cable delay. FIG. 8I may be developed as a scan 828 and provided an associated timing reference 830.

Note a number of other features of the system. The same scanning system and scanning clock in TRX1 is used to develop the self scan of the pulse 808 in FIG. 8C and the received signal 828 in FIG. 8J. Thus, fixed or temperature variable delay errors between the TRX1 transmitter system and TRX1 receiver system are common to both measurements and removed when the measurements are subtracted to find the difference 832. Likewise the scans of FIG. 8E and FIG. 8H are made by the receiver system of TRX2, removing errors relating the TRX2 transmitter timing to the TRX2 receiver timing.

The TRX2 transmitter timing may be controlled to produce a scanned pulse 822 with timing related to the received pulse 816 of FIG. 8E. (A feedback loop may be used to control the timing.) As shown, the timing reference 824 for FIG. 8H is controlled to line up with the timing reference 816 of FIG. 8E. To further reduce errors, TRX1 may send its self scan 808 of FIG. 8C to TRX2 so that TRX2 may use the same timing offset 810 for TRX2 associated timing reference 824 of its own self scan 822 FIG. 8H. Also TRX2 may send TRX2 scan 814 of FIG. 8E to TRX1 for comparison with TRX1 scan 8J of the TRX2 return signal to determine any timer delta Ttbd (see FIG. 5A-5E) so that timing from FIG. 8C and FIG. 8J may be accurately compared 832. As shown, turn around time is controlled to be zero (zero mod frame time) by lining up the timing reference 816 for FIGS. 8E and 824 for FIG. 8H. Thus, FIG. 8J is a direct measure of the round trip propagation delay, Tround=2 Tprop. (If the round trip includes more than one frame time, frame time must be included.) The result is an antenna to antenna measurement of propagation delay which is independent of internal system delays including cable delays and mismatch between transmitter and receiver timing.

The system may be modified to use other calibration methods, such as fixed calibration, to determine antenna signal timing. Also, given the complexity of antenna reflections, slight adjustments may be made for precise antenna position based on calibrated measurements.

Alternative embodiments for calibrating an impulse radio are described in U.S. patent application Ser. No. 10/245,222 (filed Sep. 17, 2002), which is incorporated herein by reference.

FIG. 9A-FIG. 9D illustrates the timing of an exemplary time transfer link wherein both TRX1 and TRX2 transmit at the same time. The timing of FIG. 9A-9D may be used to establish one or more timing repeaters for a timing beacon network. In the sequence of FIG. 9A-9D, the detail of FIG. 8A-8J may be utilized, but is not shown. FIG. 9A illustrates a transmitted pulse 904 and associated time reference 902. FIG. 9B illustrates a pulse 908, which is the pulse 904 of FIG. 9A received at TRX2 together with an associated time reference 906. FIG. 9C illustrates a return pulse 912 and time reference 910 transmitted from TRX2. FIG. 9D illustrates a received pulse 916, which is the pulse 912 received at TRX1. In FIG. 9C the return pulse 912 from TRX2 is controlled to transmit at the same time (modulo time) as the pulse 904 of TRX1. In one embodiment, the process of FIG. 8A-8J is used to initially determine propagation delay and then TRX2 changes mode to transmit at TRX1 transmit time by advancing TRX2 transmit time by Tprop+Ttbd. Thereafter, the advanced transmit time is reflected in the Tturn value and the calculation proceeds as in FIG. 8A-8J. Any change in Tprop or Ttbd results in a new advance value for TRX2 transmit time. In another embodiment, a control loop is used to set the advance time for TRX2. A round of communications is performed in accordance with FIG. 8A-8J to determine Tprop and T1. If T2 is not at T1, a slight adjustment is made in T2 in the direction of T1 and a new round of measurements is made. The adjustment may be a fixed value or may be proportional to the error, or may include other terms as are known for control loops. The measure and correct process is continued indefinitely. In a further measure, the amount of adjustment may be influenced by a confidence factor determined from signal to noise measurement at TRX1 and TRX2 and any other indications of signal quality and measurement confidence, i.e., a low confidence in the propagation delay value would reduce or suspend the adjustment of T2. In one embodiment, tracking confidence and error information may be included in the data stream transmitted by TRX2 for use by systems relying on TRX2 for timing.

FIG. 10A-FIG. 10D illustrates the timing of a time transfer system wherein the arrival time of the return pulse at TRX1 is the same as the transmit time for TRX1. FIG. 10A illustrates the time of the TRX1 transmit 1004 and timing reference 1002. FIG. 10B illustrates the timing of the received pulse 1008 and reference 1006 at the TRX2 receiver. FIG. 10C illustrates the timing of the TRX2 return pulse 1012 and timing reference 1010. The return pulse 1012 is advanced by 2 Tprop+Ttbd so that the return pulse 1012 will arrive at TRX1 at the same time (mod frame time) as the transmit pulse 1004 from TRX1, as shown in FIG. 10D. FIGS. 9A-9D and FIGS. 10A-10D illustrate that any timing relationship may be maintained between the transmit pulses of TRX1 and TRX2 as long as the advance time is accounted for in the round trip timing calculation.

Code Word Timing Resolution

The timing pulse that identifies the timing reference is resolved from the many pulses of a pulse train by using a code. The code length is preferably chosen to correspond to a distance that is greater than the distance between the transmitter and receiver. Multiple pulses are integrated to form a data bit in the manner well known for communicating data using UWB pulse trains. A code is chosen so that a shift of one pulse time results in significant attenuation of the integration result, i.e. the code has very low autocorrelation side lobes. A strong signal, however, may be acquired and data may be demodulated on a side lobe. For data communication, this may be acceptable, but for timing transfer, this presents potential timing error. Thus, for timing transfer a further validation of code phase may be performed. In one embodiment, code phase validation is achieved by shifting the code in phase to test all potential side lobe positions. The strongest signal would then be the correct code phase. In another embodiment, the code may vary from one code to another in a prescribed manner. Continuous tracking of the changing code further validates the code phase. The changing code may also be used to extend the code length. Thus, a particular code position in a sequence of short codes could be resolved by the changing code. Maintaining track would validate code-to-code position because being out of phase would result in loss of lock and require relocking.

FIG. 11A and FIG. 11B illustrate potential codes for use in time transfer. Referring to FIG. A, a pulse train may comprise a sequence of codes 1102-1108. The codes 1102-1108 may be the same. Alternatively the codes may vary. For example, codes 1102-1106 may be the same and code 1108 may be different. Using a code sequence that is predominantly the same code allows for fast acquisition on the most predominant code. Occasionally changing the code has the effect of increasing the code resolution length and reduces side lobe uncertainty.

FIG. 11B illustrates increasing the effective code length by varying the code spacing. Referring to FIG. 11B, four code sequences 1110-1116 are sent with varying intervening spacing times 1118-1122. Thus the composite sequence has an effective length of the four codes 1110-1116 plus the intervening spacing 1118-1122.

Thus, short codes may be made effectively longer by varying the spacing 1118-1122 between codes, or varying a portion of the short codes, or by varying the length of the short code. Combinations of codes may be used that allow fast lock on the short code while resolving longer time intervals with a periodic code change. Further details on codes of these types may be found in U.S. Pat. No. 6,788,730 and patent application Ser. No. 09/878,923 which have been incorporated herein by reference.

Data Sync Pattern

After pulse timing ambiguities are resolved, data ambiguities are resolved by finding a data sync pattern. Referring back to FIG. 1, the data sync pattern 102 may be one or more data bytes or words with a specific pattern or value. The pattern may be unique for left or right shifts of the pattern to uniquely identify the proper synchronization. It is desirable that the pattern be different from possible data patterns, however, since data patterns typically do not repeat from one data frame to the next, and the synchronization pattern does, the repeating property of the sync pattern 102 may be used to identify and confirm the synchronization pattern 102.

Once data bits are synchronized, a timing data value 104 is received wherein the timing data value communicates the time for an associated timing reference point 101. An exemplary timing reference point 101 may be the first pulse 112 of the first data bit 108 of the timing data synchronization pattern 102; however, any point may be chosen that can be uniquely identified.

Time Code Counter

In one embodiment of the invention, a time code counter method is used that conveys timing data to any desired repeat length, provides for synchronization, includes a timing reference point, and can be received with an arbitrarily long integration time to acquire and receive timing information in weak signal, long distance, or interference conditions.

Figure 12:
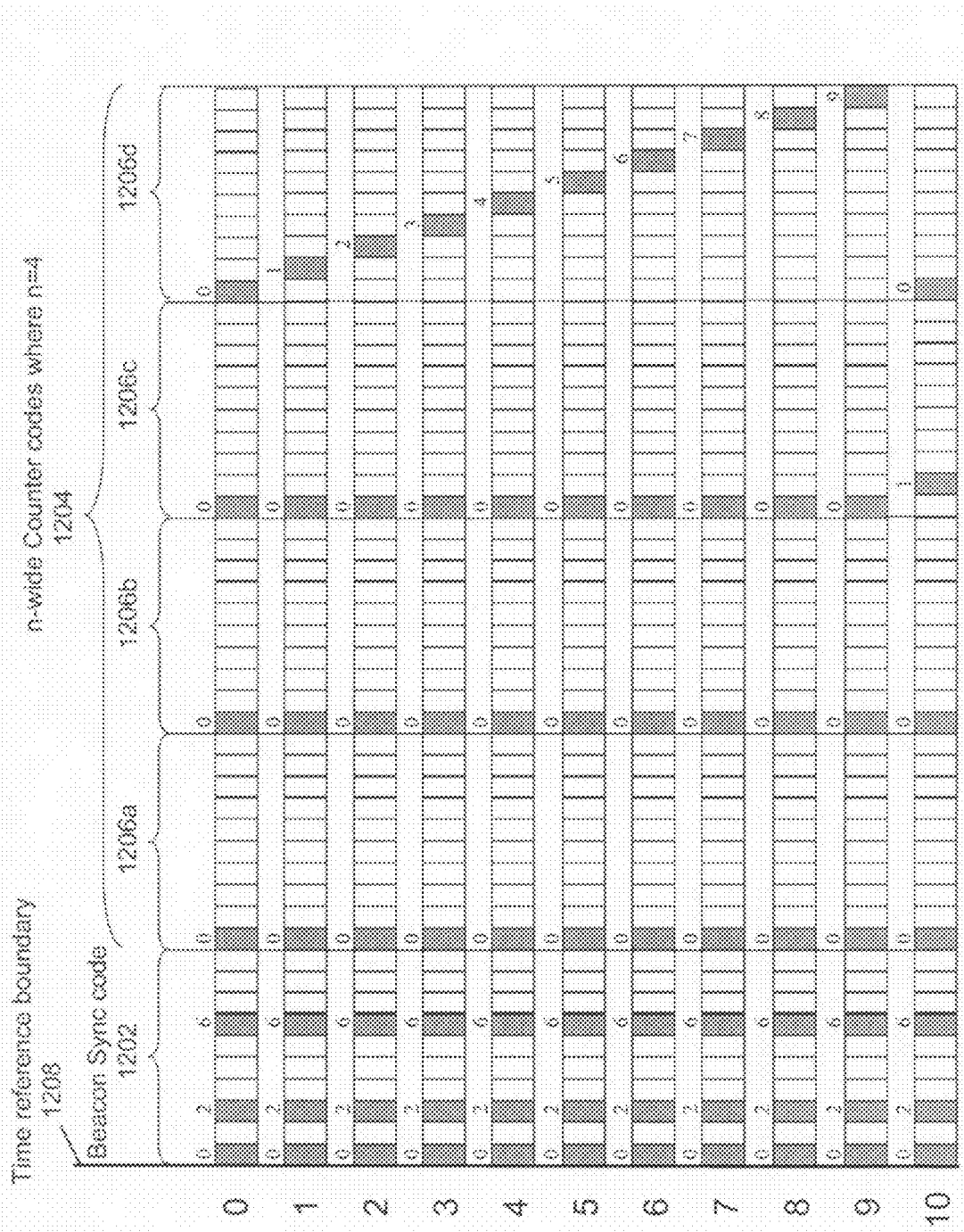
FIG. 12 and FIG. 13 show an exemplary time code counter system for encoding time in accordance with the present invention.
Figure 13:
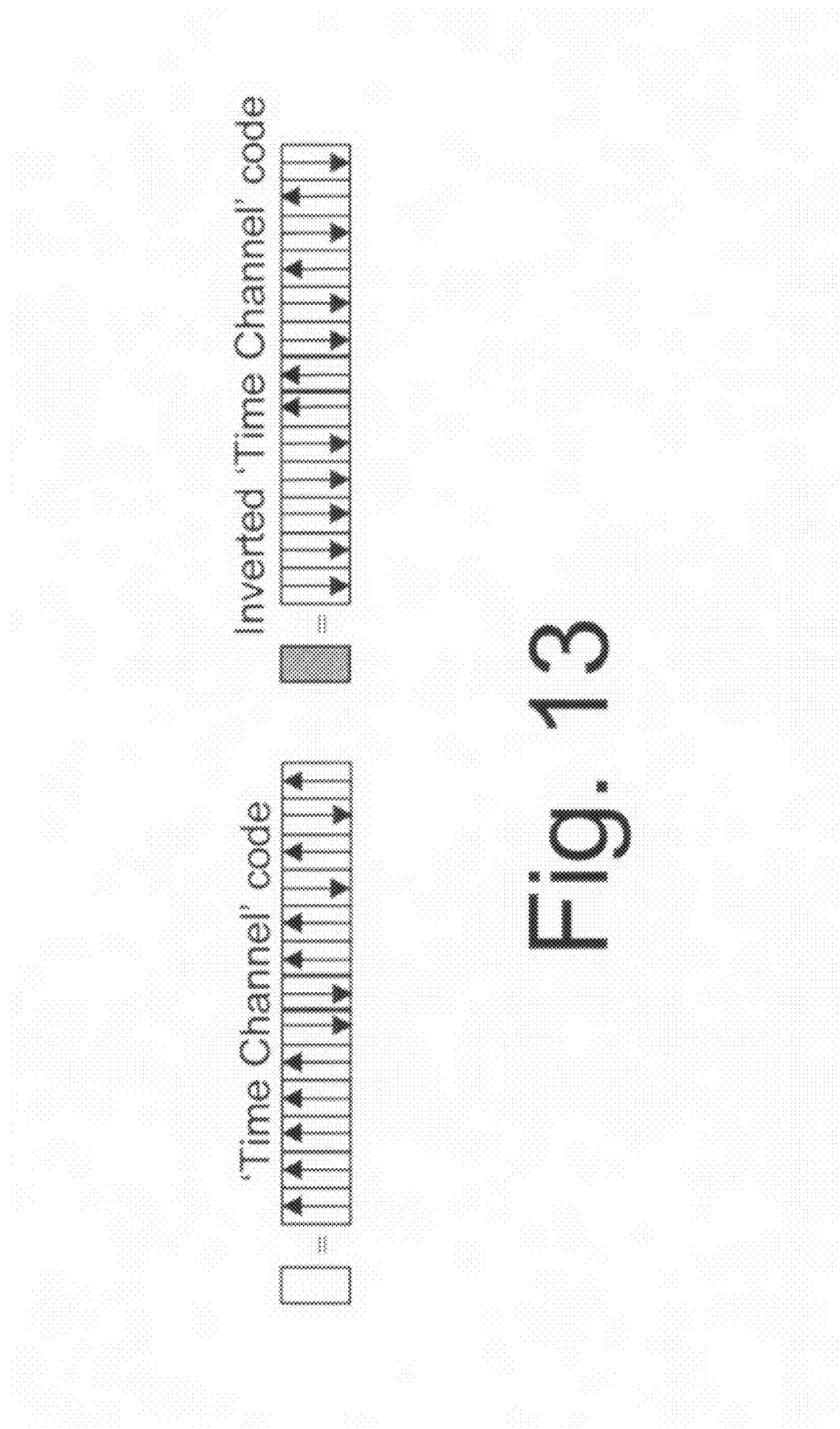

FIG. 12 and FIG. 13 show an exemplary time code counter system for encoding time in accordance with the present invention. FIG. 13 shows a legend for the table of FIG. 12. As indicated by FIG. 13, the clear locations in the table of FIG. 12 represent a coded sequence of pulses, in this case the code shown is a 13 length Barker polarity modulated code; however, the code may be any code suitable for UWB including PN sequences, time modulated codes, and others. The shaded locations in the table represent an alternate code, in this case the flip, or opposite polarity of the clear location code is shown.

In one system implementation, each code sequence shown by a clear or shaded box may be integrated and detected as a data bit; thus, clear boxes may be zeroes and shaded boxes may be ones.

Referring to FIG. 12A, eleven rows marked 0 through 10 are shown. Each row represents a coded sequence comprising a beacon sync code portion 1202 and a counter code portion 1204. Time wraps in the table of FIG. 12A such that the first pulse of row 1 follows the last pulse of row 0 and so on down the table. The counter code 1204 is shown as a four digit decimal counter comprising digits 1206a-1206d. The beacon sync code comprises a ten box interval including three shaded codes at positions 0, 2, and 6. No time shift of any combination of counter plus sync bits generates a mistaken beacon sync code pattern. Thus when a beacon sync code is found, the subsequent counter code indicates the time associated with an associated time reference boundary 1208, which is defined by the first pulse of the first code in the beacon sync code 1202 for the associated counter code 1204 (counter code on the same row). If some combination of beacon sync code 1202 and counter codes 1204 may infrequently generate a shifted beacon sync code pattern, additional steps may be used to resolve the ambiguity. In one embodiment, the repeating nature of the beacon sync code can be used to resolve the ambiguity. False sync codes will not repeat on the next row.

In one embodiment, a system of multiple beacons may identify the beacon by the beacon sync code. The beacon sync code may be unique for a given beacon and thus also identify the beacon.

The spectrum of the signal is a function of the spectrum of the code and the spectrum of the data, e.g. the 13 length Barker code, and the beacon sync and counter. In one embodiment, the spectrum is further spread by using a longer code. In another embodiment, the spectrum is further spread by using a more pseudo-random counter or by using the same counter and exclusive-or-ing the counter with a pseudo random sequence.

The counter code shown is an n-digit decimal code where n=4. The position of the flipped (shaded) code within the associated ten code length digit sequence represents the digit value for that digit sequence. Thus row 0 flipped indicates decimal 000, row 1 flipped indicates decimal 001 and so on to row 10, which indicates decimal 0010. Each row indicates the time value of the associated time reference boundary for that row. (Note that the time reference boundary may be arbitrarily chosen as long as the transmitter and receiver use the same definition.)

The choice of the counter length, n, depends on system requirements for the particular application. The counter length should be sufficient to overcome timing ambiguities. For example, the counter length may be sufficient to span the propagation delay time or the counter may span the time between manual timer settings. The counter 1204 may be used with other data, transmitted by UWB or other means, to extend the time reference to longer times, such as seconds, hours, days, or years. In one embodiment, one or more counter time slots are used to transmit a data stream. The data stream may include the most significant bits or digits of timer synchronization.

The code sequence of FIG. 12A has advantages for both fast acquisition and for long range. For short range, the table may be treated as one data bit per code sequence as shown. For longer range, where noise and/or interference corrupt occasional data bits, the receiver internal clock can maintain time that is relied upon and the incoming data can be used to provide a confidence value for the internal clock. Thus, if most of the received data bits agree with the internal clock over time, confidence can be gained in the internal clock synchronization. If substantial disagreement is found, the internal clock may be shifted and checked against the incoming data, or several shifted versions of the internal clock may be checked in parallel with the incoming data. Thus, the internal clock may be synchronized in the presence of a weak signal or interference.

In another mode of operation, the code structure of FIG. 12 may be used in very weak signal conditions. Very weak signals may be initially acquired integrating for longer than a single code length. An arbitrary number of code lengths may be integrated to detect the signal and determine code synchronization. Because most of the codes are clear box codes, the receiver may search for energy using a receiver integration length that is purely white box codes. For example, 100 white box codes may be used to integrate for one signal detection step in an acquisition process. If no energy is found, the time base may be shifted to integrate again for 100 white box codes, and so on. When energy is found, the receiver may engage a tracking loop to track the signal, achieving pulse, code, and frequency lock on the signal.

Once signal lock is verified, the receiver may then search for beacon sync code patterns. An integration length of 100 codes may still be used, but the integration data comes in groups, i.e. the sampler samples and integrates ten consecutive code lengths using a beacon sync code pattern, 130 pulses in the example of FIG. 12A. Then the sampler skips 40 code lengths and integrates the next 10 code lengths and so on, collecting the energy of 100 code lengths over a period of 500 code lengths. If the first code lines up with the first code of a beacon sync code pattern, the integration process will detect strong energy. If not, the result will be a weak signal and the process may shift by one code length (13 pulses) and integrate another 100 code lengths, and repeat the process until a strong detection is found.

Once the beacon sync pattern is found, the receiver may then determine the counter value. The most significant digits may be determined by integrating consecutive like digits, watching for a transition. For example, 100 most significant digit 1206*a* "0" position codes may be summed to determine the 0 or 1 bit value of that position. It will take a total time of 5000 codes to sum 100 digit values for the example. Digit values "0", "1," "2," and so on may be summed in parallel to speed the process. Consecutive 100 length integrations may be observed to detect a transition. A weak signal may indicate a digit transition occurring during that integration interval.

The least significant digit 1206*d* may be detected by integrating diagonally, i.e. consecutive counter values are moved over one code length and summed. If the phase is right, the sum will comprise entirely shaded box codes and the counter least significant digit may be set. Once the least significant digit is set, the next least significant digit may be integrated using the transition information from the least significant digit to track the movement of the next least significant digit. For the next least significant digit, ten consecutive "0" boxes are integrated and then ten consecutive "1" boxes are integrated and so on, transitioning from "0" to "1" as the least significant digit transitions from "9" to "0". If white box code energy is found, the phase is shifted by one code position and the integration repeated until shaded box code energy is found. When shaded box code energy is found, the second least significant digit may be set. The process may then be repeated until all digits are determined.

Although the code length shown is 13 pulses, an arbitrary number of pulses may be integrated for acquisition, track, and counter decode to increase the range as needed for a given system. Additionally, although the transmitted counter codes are shown to begin at 0000, the counter codes can begin at other values. For example, under one arrangement, a transmitter might begin transmitting at midnight a counter code beginning with 0000. Or, a transmitter beginning transmitting at some later time might begin the counter at a value corresponding to that later time. As such, the counter codes may themselves convey information about the start time of transmissions. Alternatively, the counter codes may not convey such information because that information is known to the transmitter and receiver.

Synergistic Integration of Time, Distance, and Data

Thus, it can be seen that the present invention allows for the transfer of precision timing, measurement of distance, and communication of data, all with the same architecture. Indeed, one method for timing transfer includes measurement of the first arriving pulse, and round trip delay, which are the essential data required for distance measurement. Distance measurement is further explained in U.S. Pat. Nos. 6,133,876 and 6,295,019, which have been incorporated herein by reference.

Transmitter, Receiver, and Transceiver Architectures

Transmitter, receiver, transceiver, and network architectures will now be described that implement time transfer in accordance with the timing methods described herein.

Figure 14:
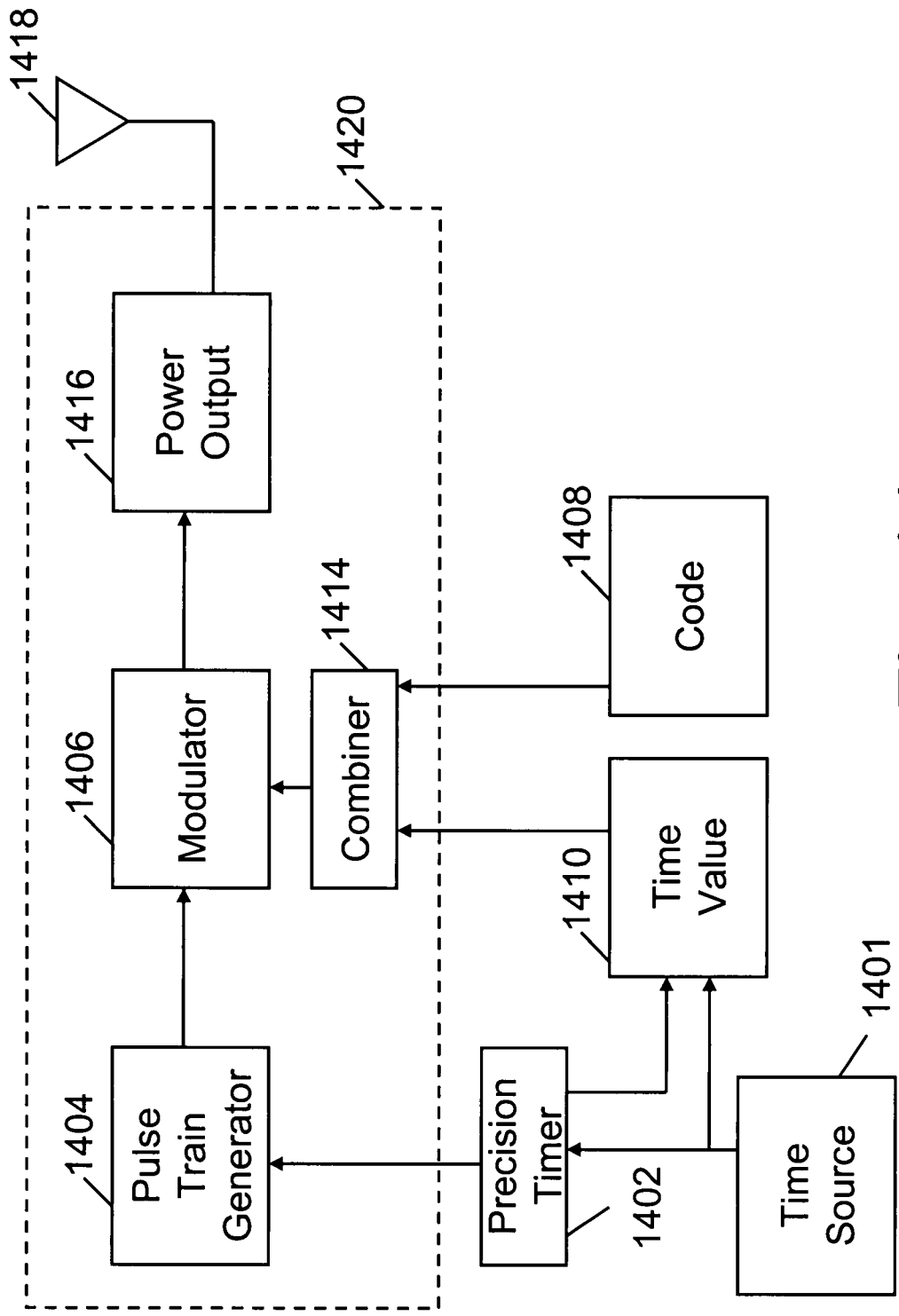
FIG. 14 is an exemplary block diagram of a timing reference transmitter in accordance with the present invention.

FIG. 14 is an exemplary block diagram of a timing reference transmitter in accordance with the present invention. Referring to FIG. 14, the transmitter comprises precision timing functions and a pulser 1420. The pulser 1420 further comprises a pulse train generator 1404 a modulator 1406, a combiner 1414, and an output stage 1416. The pulse train generator 1404 generates a pulse train in accordance with a precision timer 1402 which is optionally synchronized to a timing source 1401. The precision timer 1402 controls the time of each pulse and the pulse repetition rate. The precision timer 1402 also controls a time value register 1410 (also called a clock) that keeps track of time intervals. The modulator 1406 modulates the pulse train by a code 1408 to spread the spectrum and to aid in identifying pulse timing. The code modulated pulse train is further modulated with the time value 1410. In one embodiment, the time value modulates the code in the combiner 1414 and the result modulates the pulse train. The modulated pulse train is then optionally amplified 1416 and then transmitted via an antenna 1418. The timing reference may also be synchronized with a timing source 1401 such as a reference traceable to government established standard time. The link to standard time may be by cable, or radio or by another UWB link in accordance with the present invention.

The time value 1410 may include a data synchronization marker to identify the beginning of the data word or message. The pulse waveform, code, time value, and pulse train identify time precisely in accordance with the pulse train and uniquely within the range of the time value word. Thus, time may be traced back to the precision timer with a precision relating potentially to a fraction of an RF cycle over a time span relating to the number of bits in the time value word, which may be arbitrarily long. The code, time value and pulse train each relate to different time scales in the time signal. The pulse defines the precise instant in time, potentially down to tens of picoseconds (for and exemplary 3 GHz UWB system). The code resolves pulse-to-pulse ambiguity and may span 100 pulses, or 5 microseconds (for an exemplary 20 Mega pulses per second (Mpps) system). The time value may then resolve code-to-code ambiguities to minutes, if desired, or to millennia, if needed.

Figure 15:
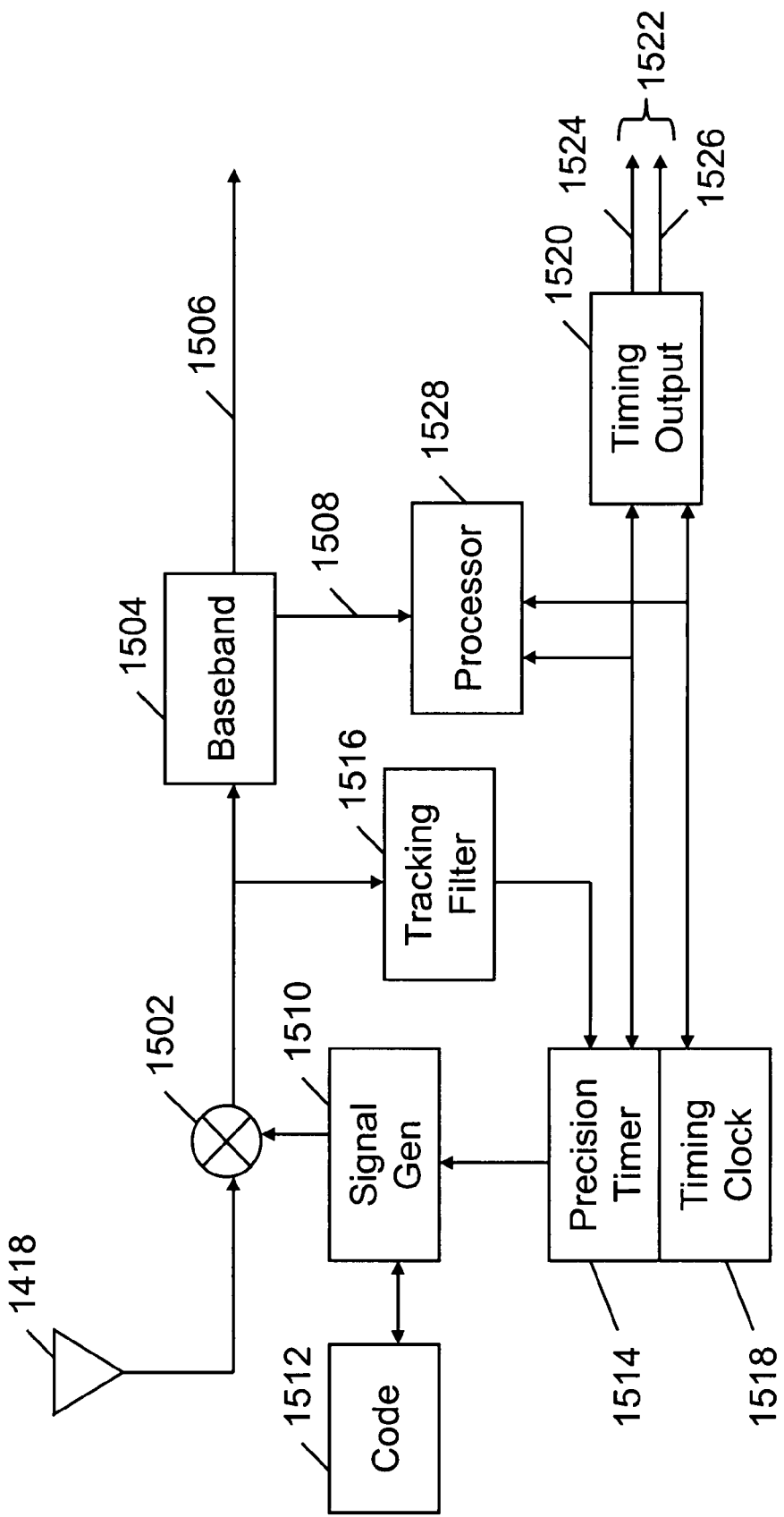
FIG. 15 is an exemplary block diagram of a timing receiver in accordance with the present invention.

FIG. 15 is an exemplary block diagram of a timing receiver in accordance with the present invention. Referring to FIG. 15, the heart of the timing receiver is a precision timer 1514 that is locked to an incoming signal from the antenna 1418. The precision timer includes a controllable oscillator, controlled by the output of a tracking filter 1516. The precision timer clocks a timing clock counter 1518, which is a counter having as many bits of timing information as needed for a given application. The value of the timing clock may include the most significant bits represented by the counter together with the fine resolution, which may be considered least significant bits, represented by the timing of the oscillator.

The incoming signal is received using a baseband converter 1502, which may be a sampling stage or a template correlator stage. A sampling signal or template signal is provided by a signal generator 1510 triggered by the precision timer 1514. The signal generator may include a code 1512 to resolve code modulo timing (within the code repeat length).

A tracking error signal resulting from the conversion process is filtered by a tracking filter 1516 and used to adjust the precision timer 1514 to lock to the incoming signal. A baseband processor 1504 further processes the sampled signal to detect a data stream 1506 which may include timing data 1508.

A processor 1528 receives the timing data, which may include a timing value and may include propagation delay information and other information. The processor 1528 may set the timing clock counter 1518 in accordance with the received time value, or may set the timing clock counter 1518 with a time value which is the received time value corrected by propagation delay. The timing output 1520 combines the precision timer signal 1514 and clock counter 1518 to produce a timing signal 1522 comprising a timing pulse 1524 having a precise transition edge related to the received pulse timing and a timing value 1526 which identifies the time associated with each respective timing pulse. Thus, in one exemplary embodiment, the timing signal 1522 comprises a square wave clock signal with a rising edge indicative of the time reference point in the received code sequence in combination with a parallel data word indicating the time value 1526 of the start of the square wave cycle. The parallel data word typically need not (but may) include redundant significant bits representing time between square wave pulses, i.e.

the timing word may be a counter indicating the number of square wave intervals that have lapsed from a reference start time.

The timing output may also include a controllable delay on the timing pulse signal to adjust for propagation delay. The processor 1508 may set a value in the timing output 1520 to control the controllable delay. Where the controllable delay is used, the counter bits should be representative of the delayed pulse signal. In an alternative embodiment, the variable delay is placed between the precision timer 1514 and the timing clock counter 1518. The timing output 1522 comprises the delayed timer and the timing clock counter 1518.

FIG. 16, comprising FIG. 16A-FIG. 16C, illustrates the relationship among several of the waveforms that may be used in the systems of FIG. 14 and FIG. 15. FIG. 16A illustrates a sequence of UWB pulses 1602a-1602c. FIG. 16B illustrates a sequence of clock pulses 1604a-1604c used to trigger the pulses of FIG. 16A. FIG. 16C illustrates a timing pulse 1606 representing a specific time as indicated by the associated timing data word 1526 (time value). The timing data word 1526 may indicate the time of the rising edge 1608 of the timing pulse.

Figure 17:
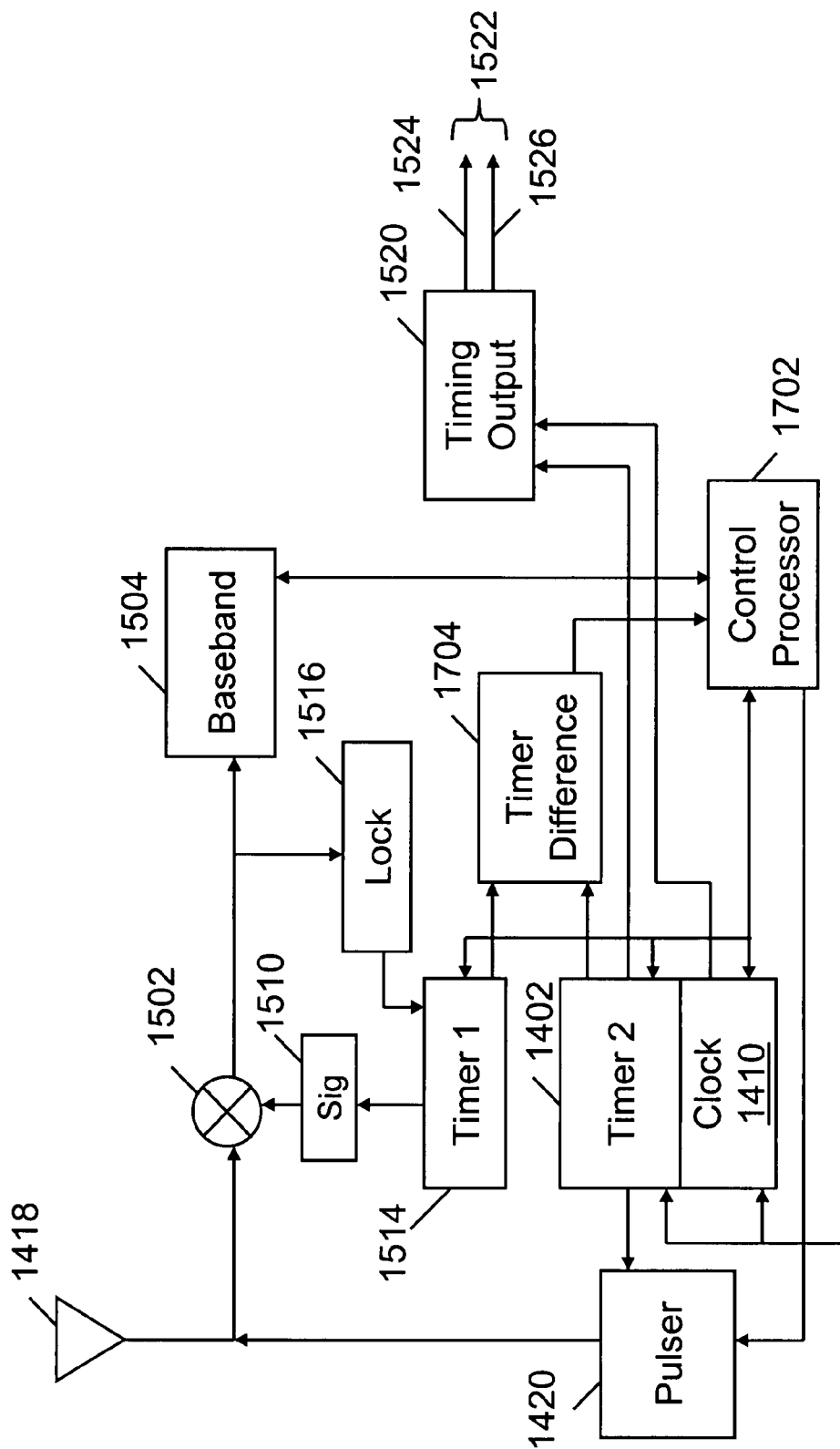
FIG. 17 is a block diagram of an exemplary transceiver utilizing a transmitter time base and a receiver time base, where the time difference is measured between the transmitter time base and the receiver time base

FIG. 17 is a block diagram of an exemplary transceiver utilizing a transmitter time base and a receiver time base, wherein the time difference is measured between the transmitter time base and the receiver time base. The transceiver of FIG. 17 may be used as a beacon transceiver to transmit timing signals and communicate with a second transceiver to determine propagation delay time to the second transceiver. The propagation delay time is derived from the difference between the transmitter time base and receiver time base when synchronized two-way communications is achieved between the beacon transceiver and second transceiver. In the transceiver of FIG. 17, the time difference is measured. The transceiver of FIG. 17 may also be used as the second transceiver to receive timing information.

In a first embodiment, the system of FIG. 17 is used as a first transceiver (beacon) in a two transceiver link. Referring to FIG. 17, two timers (also referred to as time bases) are used, a receiver timer 1514 and a transmitter timer 1402. The transmitter timer 1402 controls the pulser 1420 to control pulse and code (not shown) timing for the transmitted signal. The receiver timer 1514 controls baseband converter timing and receive code (not shown) timing. The timers 1402, 1514 may be controlled by a control processor 1702 to perform signal acquisition and scanning functions, as necessary. The receiver timer 1514 may also be controlled by a tracking filter 1516 to maintain lock on the received signal. The difference between the transmitter timer 1402 and the receiver timer 1514 is determined by a timer difference function 1704. The timer difference function 1704 may be utilized by the control processor 1702 along with other information to determine propagation delay. A baseband processor 1504 demodulates data from the second transceiver. The data may include scan data, such as multipath pattern data, and/or turn around delay information. The transmitter timer 1402 also drives a clock, which contains a clock register having a time value to be transmitted. The clock register may be implemented as a counter driven by the transmitter timer 1402. The time value is included as data in a timing message that is transmitted. The transmitter may also transmit propagation delay information and/or multipath pattern information according to the mode of operation.

The control processor 1702 receives timer difference information from the timer difference function 1704 along with turn around time information from the second transceiver as part of the data to compute round trip delay and associated propagation delay. In some embodiments, the control processor 1702 may control the receiver timer 1514 to produce scan data. The control processor 1702 may also receive scan data from the second transceiver, and may perform pattern matching in the determination of round trip delay and propagation delay. Propagation delay information is then placed in the data stream to be transmitted to the second transceiver.

In one embodiment, the transmitter timer 1402 (and clock register 1410) is synchronized to a time reference source 1401. The time reference source 1401 may be traceable to a standard time source such as operated by Government agencies.

Further details on time difference measurement may be found in U.S. Pat. Nos. 6,577,691, 6,295,019, and 5,687,169, which have been incorporated herein by reference. The transceiver of FIG. 17 may also be a member of a timing network or may be a timing repeater.

In an alternative embodiment, the transceiver of FIG. 17 may be the second transceiver, which receives timing information from the beacon transceiver. For operation as a second transceiver, the receiver time base 1514 is first used to acquire and track the beacon signal. The transmitter time base 1402 is then locked to the receiver time base 1514, either directly or by using the timer difference measurement 1704 in a feedback loop and controlling to a predetermined timer difference measurement 1704. The beacon then calculates round trip delay and propagation delay and transmits propagation delay information to the second transceiver. The second transceiver then adjusts the transmitter time base 1402 to the timing of the beacon transceiver, or some other desired timing, by using the propagation delay information. Timing output 1520 may then be derived from the transmitter time base 1402 and clock 1410.

A composite time signal 1522 may be generated by combining time value data and propagation delay information with transmitter time base 1402 and clock information. In one embodiment, the control processor 1702 sets the transmitter time base 1402 and clock in accordance with received time value and propagation delay information. The transmitter time base 1402 thereafter maintains the clock at the correct time. The composite time signal 1522 may comprise clock timing 1524 and associated digital data 1526.

In a further alternative, the transmitter pulser 1420 is not necessary or not used. Propagation delay information may not be used or propagation delay information may be obtained by other means than round trip timing. Thus, to establish timing, the receiver timebase is used to acquire and track a beacon signal. When locked, the transmitter time base 1402 is set for the desired timing relative to the receiver time base 1514 by measuring the time difference and adjusting the transmitter timing in a feedback loop. The desired transmitter timing difference may include propagation delay information as necessary.

Figure 18:
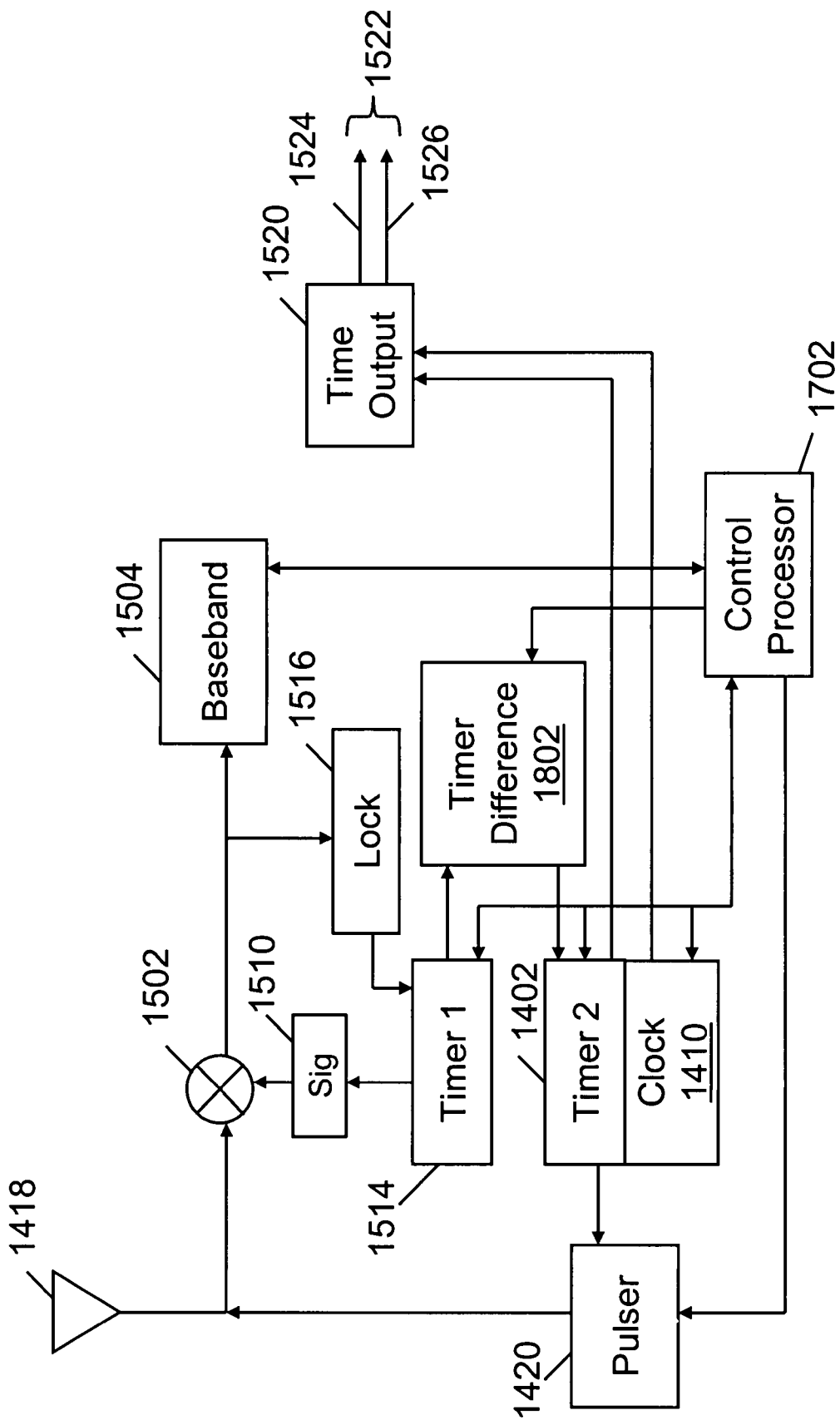
FIG. 18 is a block diagram of an exemplary transceiver utilizing a transmitter time base and a receiver time base, where the transmitter time base is derived from the receiver time base by controlling the time difference between the receiver and transmitter time bases.

FIG. 18 is a block diagram of an exemplary transceiver utilizing a transmitter time base and a receiver time base, wherein the transmitter time base is derived from the receiver time base by controlling the time difference between the receiver and transmitter time bases. Further details on time difference controllers 1802 may be found in U.S. patent application Ser. No. 10/712,269 (filed Nov. 14, 2003), which has been incorporated herein by reference. The transceiver of FIG. 18 may be advantageously used as the second transceiver in a two way synchronized timing transfer system, where the second transceiver receives timing from the beacon transceiver. The transceiver of FIG. 18 receives timing information comprising timing reference and clock value information, and potentially receives propagation delay information from the beacon transceiver. The transceiver of FIG. 18 may provide timing via a timing signal 1522 or may provide timing via the transmitter signal (timing repeater).

Referring to FIG. 18, the transceiver includes a receiver time base 1514, baseband converter, lock loop, baseband processor 1504, transmitter time base 1402, pulser 1420 and control processor 1702 that provide similar functions to those of FIG. 17. In FIG. 18, however, the transmitter time base 1402 is derived from the receiver time base 1514 by using a time difference controller 1802. In one embodiment, the transmitter time base 1402 operates at a fixed delay from the receiver time base 1514. In another embodiment, the receiver time base 1514 provides timing signals to the transmitting functions directly, without adding a dependent time base. In a third embodiment, the time difference controller 1802 is variable and under the control of the control processor 1702.

The transmitter timer 1402 also drives a clock, which contains a clock register having a time value to be transmitted. The clock register may be implemented as a counter driven by the transmitter timer 1402. The time value is included as data in a timing message that is transmitted. The transmitter may also transmit propagation delay information and/or multipath pattern information according to the mode of operation. The output of the receiver time value register 1520 may be a clock signal 1524 and a value signal 1526, or may be a combined clock 1410 and data serial stream, such as is known for IRIG timing, for example. The receiver time value register may also include an adjustment for propagation delay. In one embodiment, the adjustment for propagation delay is used to set the transmitter time base 1402 and clock 1410. The time base then maintains time by incrementing the clock 1410. Propagation delay information may be sent from the beacon transceiver in the data stream, or may be determined by other methods, such as by known surveyed distance measurements.

In some embodiments, the control processor 1702 may control the receiver time base 1514 to produce scan data. The control processor 1702 may also receive scan data from the beacon transceiver, and may perform pattern matching in the determination of round trip delay and propagation delay. Propagation delay information may then be placed in the data stream to be transmitted to the beacon transceiver. The control processor 1702 may adjust the time clock 1410 in accordance with propagation delay.

In operation, the receiver time base 1514 is controlled to acquire the signal from the beacon transceiver. When acquired, the tracking loop is closed to maintain track on the beacon transceiver signal. In this mode, the receiver time base 1514 is controlled by the tracking loop filter 1516. Once lock is achieved, the transmitter time base 1402 is positioned by setting the difference control. The beacon transceiver then receives the transmitted signal, measures round trip delay and decodes turn around time and multipath scan pattern data as required to determine propagation delay. The beacon transceiver then sends propagation delay information to the second transceiver. The propagation delay information is then used to calculate a correct timing for the transmitter time base 1402 and the difference is set to achieve the correct timing. The time difference may be set in any increment desired without disturbing the second transceiver lock on the beacon signal. However, if the difference is changed in large steps (more than ¼ wavelength at the UWB center frequency), the beacon may have to reacquire the signal. In one embodiment, the beacon may use the known incremental change of the difference setting to find the new signal lock point. The incremental setting change may be transmitted as part of the data stream from the second transceiver to the beacon transceiver.

Figure 19:
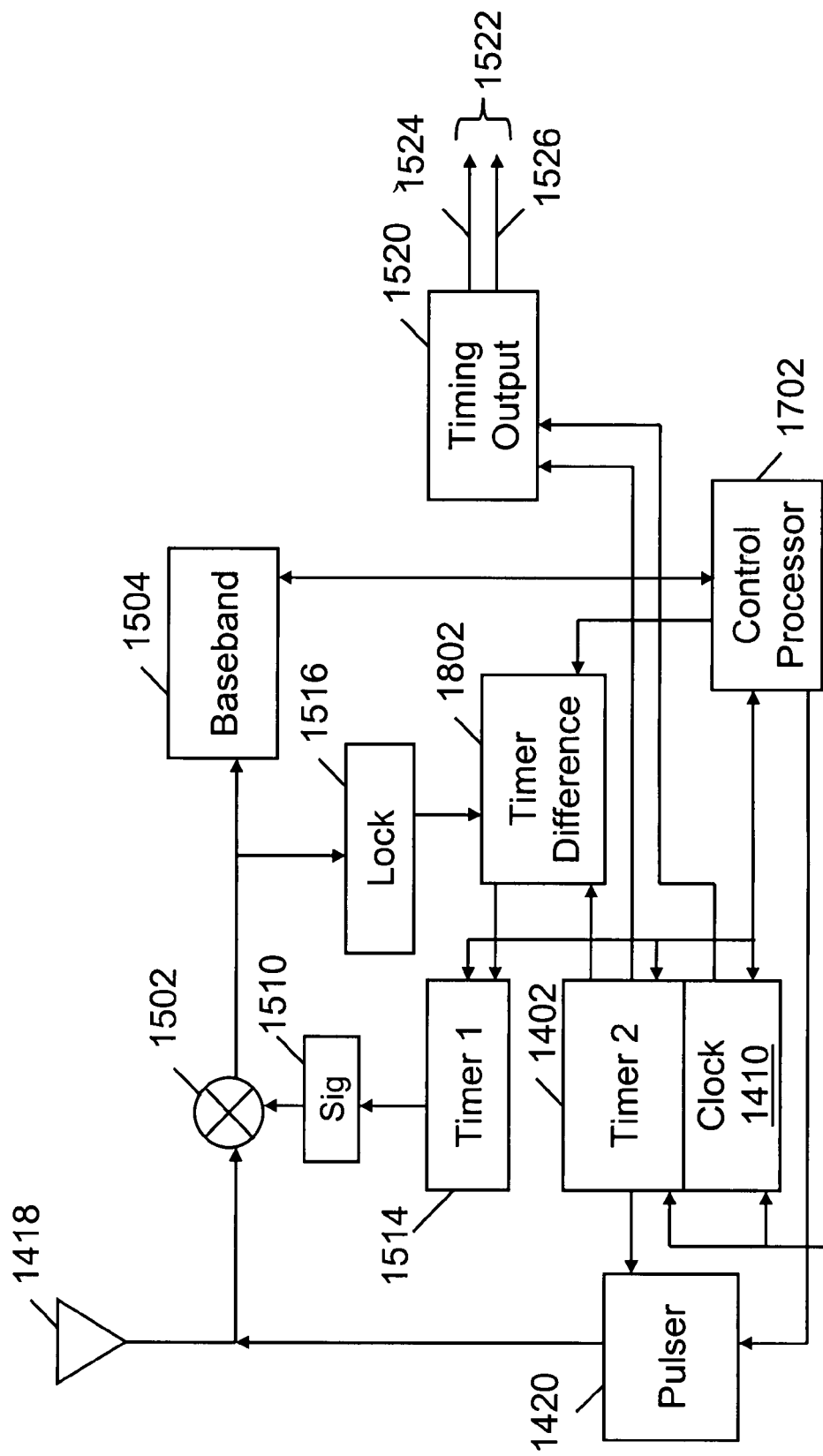
FIG. 19 is a block diagram of a beacon transceiver where the receiver time base is derived from the transmitter time base by controlling the time difference between the receiver and transmitter time bases.

FIG. 19 is a block diagram of a beacon transceiver wherein the receiver time base 1514 is derived from the transmitter time base 1402 by controlling the time difference between the receiver and transmitter time bases 1402. The transceiver of FIG. 19 may be used advantageously as a timing beacon because the transmitter time base 1402 may be held constant while the receiver time base 1514 is varied to acquire signals, scan signals or maintain lock on a signal.

Referring to FIG. 19, the transmitter time base 1402 provides timing to a time difference controller that shifts the timing of the transmitter time base 1402 to generate a receiver time base 1514. In one embodiment, the timing is shifted by a combination of shifting the phase of a sine wave signal for fine time positioning and incrementing a time counter for coarse time positioning. The timer difference may be controlled by a control processor 1702 for acquiring signals and generating scans. The time difference may also be controlled by a signal lock loop to track the received signal.

In operation, the transmitter time base 1402 and clock 1410 may initially be synchronized to a reference time base, if desired. The transmitter time base 1402 then controls the timing for transmission of a timing message assembled by the control processor. The timing message may comprise a signal structure related to the timing clock 1410 along with a data portion including time clock 1410 data representing the most significant bits of the timing information, the time clock 1410 signal structure providing the fine resolution of the timing information. The data stream of the timing message may also contain other data such as protocol information, identification information, multipath scan data, and other data. A second transceiver then receives the timing message and may use the timing message as provided or may correct for propagation delay. The correction may be by known distance or may be measured. To measure delay, the second transceiver locks on to the beacon signal to obtain stable frequency and time delay and then sends a return signal with a determined relationship to the received signal. The relationship, typically turn around time, is sent as part of the return message. The beacon transceiver then acquires the return message. The timer difference may be varied to scan time offset space for a return message. Once a return message is found, the timer difference is controlled by the output of a lock filter to maintain track on the return message. The control value required to maintain track may be used by the control processor 1702 to determine round trip delay. Round trip delay is used with turn around time and may be used with multipath scan pattern data to determine propagation delay. The propagation delay value is then transmitted to the second transceiver for setting the received time clock.

In an alternative mode of operation, the transceiver of FIG. 19 may be operated as a second transceiver unit. As a second transceiver, the transmitter time base 1402 is initially operated at an arbitrary time position. The receiver time base 1514 is then scanned to search for and analyze signals. A beacon signal may then be tracked and demodulated. Analysis data, such as scan data, may be placed on the transmitter data stream to send to the beacon transceiver. When propagation delay is determined (the calculation may be performed at either transceiver), the correct timing of the transmitter time base 1402 may be set. A sudden large move of the time position of the transmitter time base 1402 may disrupt signal tracking. Thus, in one embodiment the transmitter timing may be set in one step and the system may initiate a new signal acquisition process with the new setting. In a variation of this embodiment, the transmitter time base 1402 is set and the time difference is also set to maintain constant receiver time base 1514 value to maintain signal lock, or reduce reacquisition search space. In another embodiment, a small adjustment is made repetitively in the direction of the correct timing to allow continuous operation of track loops and signal lock algorithms.

Receiver Only and Transmitter Only Embodiments

In one embodiment, a receiver having an unknown position, or delay value, relative to a network, may determine timing by receiving timing signals from sufficient network transmitters to resolve ambiguities. Similarly, a network of receivers may receive a timing signal from a transmitter of unknown delay value and determine the timing of the transmitter.

Figure 20:
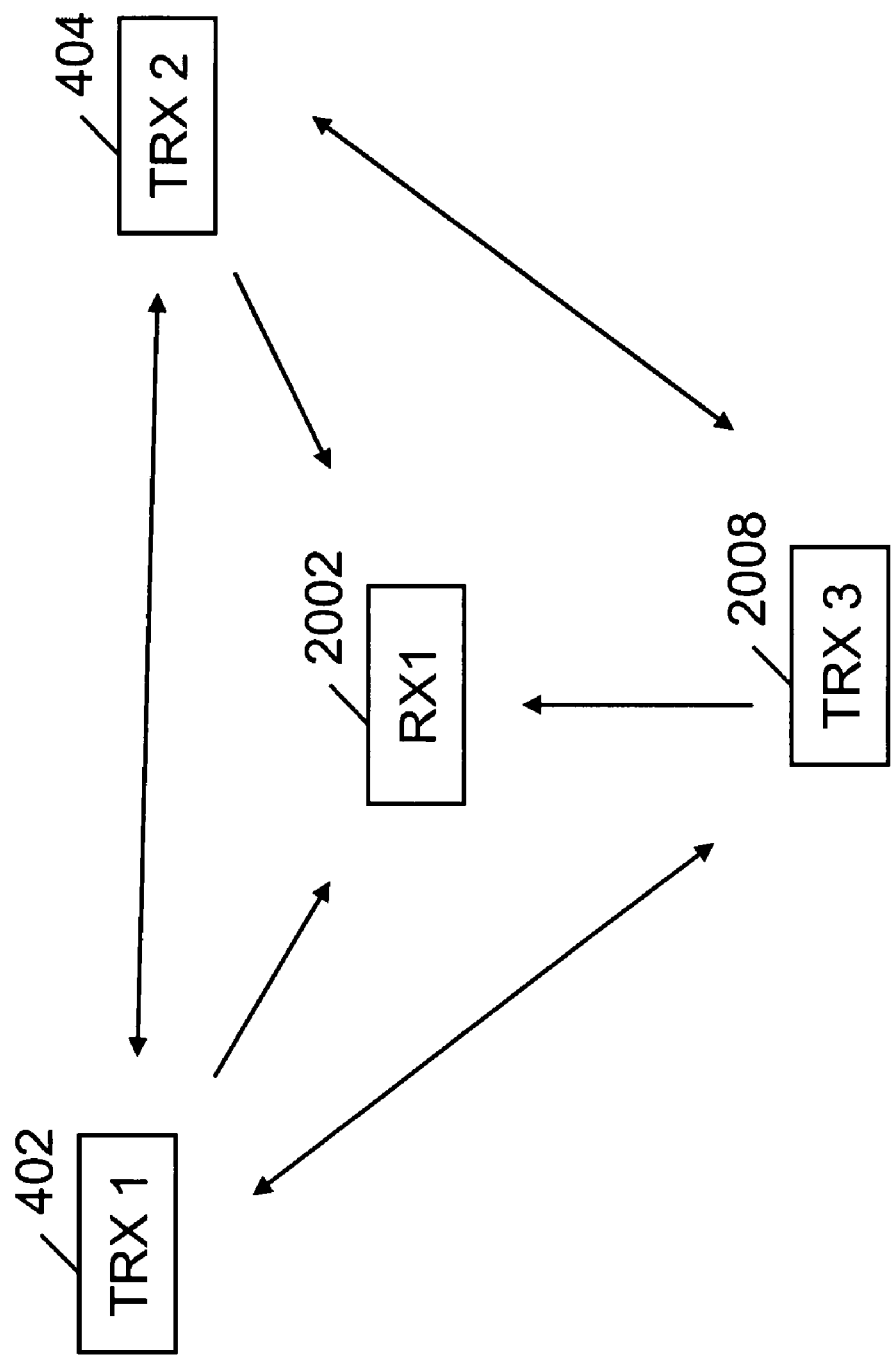
FIG. 20 illustrates a receiver determining timing from a network of time coordinated transceivers.

FIG. 20 illustrates a receiver determining timing from a network of time coordinated transceivers. Referring to FIG. 20, Receiver RX1 2002 receives signals from three transceivers TRX1 402, TRX2 404, and TRX3 2008. Each pair of transceivers may operate in turn to determine time delay and timing. TRX2 and TRX3 may receive primary timing from TRX1. TRX2 and TRX3 may compare timing with one another. The receiver RX1 may observe the communications among the transceivers and may measure differences in timing between any two of the transceivers. The transceivers, as part of their communications will transmit the delay value between each two of them. For calculation of delay time to RX1, the delay should be based on the first arriving pulse or leading edge to relate the delay to shortest distance. The shortest distance delay values can be used to generate a geometry relationship among the transceivers by triangulation. RX1 can then find the delay position that best solves the simultaneous differences among the timing signals received from different pairs of transceivers. Once the position of RX is determined, the delay from each transceiver can be found and used to correct the timing received from each transceiver. If differences remain, an average value may be used for correct timing. In one embodiment, a timing quality value is assigned based on signal to noise ratio or leading edge confidence factor produced by the leading edge algorithm. The timing quality factor may be used to weight the different timing values when determining the average timing value. In an alternative embodiment of FIG. 20, one or more of the transceivers may determine timing by methods other than by a full duplex UWB link, thus one or more of the transceivers may be a transmitter only.

Figure 21:
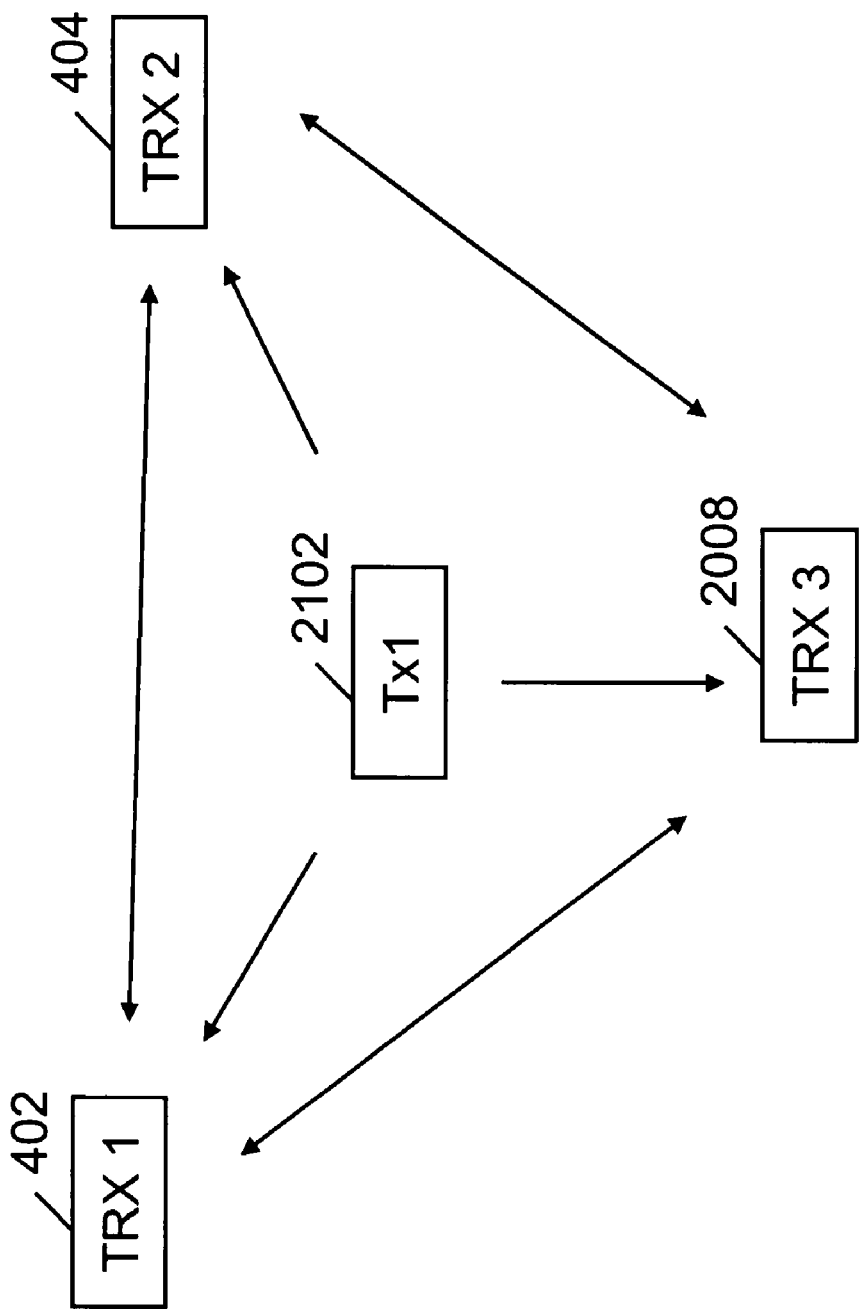
FIG. 21 illustrates a network of time coordinated transceivers determining the timing of a transmitter.

FIG. 21 illustrates a network of time coordinated transceivers determining the timing of a transmitter. Referring to FIG. 21, a transmitter TX1 2102 sends timing signals to a network of synchronized timing transceivers TRX1 402, TRX2 404, TRX3 2008. The three transceivers may communicate a timing reference from TRX1 much as the transceivers of FIG. 20. The transceivers receive the timing signals from TX1. Since TX1 is not synchronized with the network and has no knowledge of network time or frequency, TX1 will most likely drift in time and frequency from the reference transceiver TRX1. As such, the timing network of TRX1-TRX3 has to tolerate the drift of TX1. In one embodiment, the network employs sufficient code isolation to allow simultaneous transmission from TX1 to any one of the other transceivers. In another embodiment, the time slots are adaptively adjusted to accommodate the drift of TX1. TX1 may transmit for short burst of time, sufficient for all three transceivers to get a timing reading from TX1. Then, the three transceivers recheck their relative timing and communicate their measurements. Any of the three transceivers, upon receiving all of the measurements, may calculate the delays to TX1 and thus, the position of TX1. In one embodiment, the timing of TX1 may be adjusted in a feedback manner through any available communication link. In an alternative embodiment, one or more of the transceivers of FIG. 21 may determine timing by methods other than by a full duplex UWB link, thus one or more of the transceivers of FIG. 21 may be receivers only.

Timing Network

Figure 22:
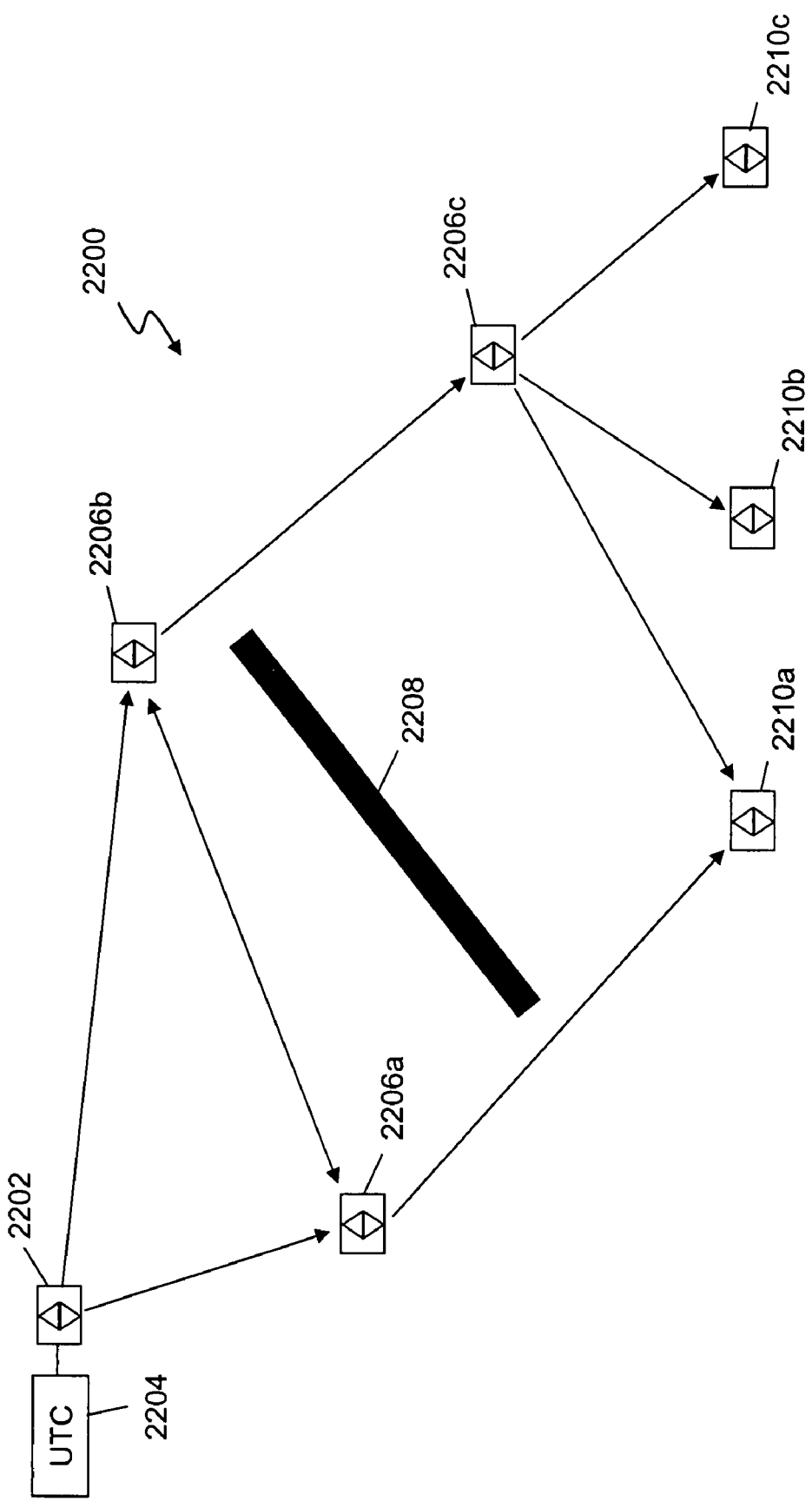
FIG. 22 illustrates a time base network including beacons and receivers operating in the presence of an obstruction.

FIG. 22 illustrates a time base network including beacons and receivers operating in the presence of an obstruction. FIG. 22 depicts a time base network 2200 comprising a primary beacon 2202, secondary beacons 2206a, 2206b, and 2206c, and time receivers 2210a, 2210b, and 2210c. Primary beacon 2202 is a UWB transmitter or transceiver and is interfaced with a time source such as universal time clock 2204. Secondary beacons 2206a, 2206b, and 2206c are UWB transceivers. Time receivers 2210a, 2210b, and 2210c can be UWB transceivers or UWB receivers. Obstruction 2208 prevents line of sight communications between primary beacon 2202 and secondary beacon 2206c and time receivers 2210a, 2210b, and 2210c. Obstruction 2208 also prevents line of sight communications between secondary beacon 106a and secondary beacon 2206c and time receivers 2210b and 2210c. All participants in the time base network use a common time channel code. Each beacon transmits using its own beacon sync code. Beacons and receivers can use various means to determine the precise distance between them such that it can be equated with a given beacon. A given receivers distance to a given beacon is likely unique and thus may be used as part of an identity verification process in network security management.

Shown in FIG. 22, primary beacon 2202 transmits a signal based on UTC 2204. The signal is received by secondary beacons 2206a and 2206b that synchronize their time bases with primary beacon 2202. The secondary beacons 2206a and 2206b also transmit a timing signal. Secondary beacons 2206a and 2206b may receive one another's timing signals and compare timing with the primary beacon. Secondary beacon 2206c receives the signal sent by secondary beacon 2206b. Time receiver 2210a can receive signals from secondary beacons 2206a and 2206c, which can be compared. Time receivers 2210b and 2210c receive signals only from secondary beacon 2206c.

Timing Repeater

A timing repeater may be formed by a first transceiver providing timing to a second transceiver (timing repeater) by exchanging relative timing signals. Then the second transceiver (timing repeater) may transmit timing signals to a third transceiver. If both the first transceiver and second transceiver are stationary, the timing repeater may continue to receive timing signals from the first transceiver without having to continue to exchange delay information.

Alternatively, the timing repeater may find delay information by survey or by communication with multiple receivers as disclosed above.

Control of a Second Transmitter by a Common Receiver

In one embodiment, two transmitters are synchronized by common reception. A receiver locks on the signals from the first transmitter to derive synchronization and timing information. The receiver then receives a second transmitter and provides control information to the second transmitter to position the timing signal at the receiver at the same timing value as the first transmitter. The receiver may receive each of the transmitters in alternate time slots. The alternate time slots may be, for example alternate pulses, alternate code sequences, alternate data bits, alternate messages, or other alternate time slots. In one embodiment, the second transmitter's signal may be placed at the same time as the first transmitter. To maintain lock on the first transmitter, there may be intervals where the second transmitter is absent to provide a clear lock on the first transmitter.

Cross Check

As a further improvement in system accuracy, where the system is a network having multiple nodes, multiple correction measurements may be made and measurements combined to improve overall accuracy.

Distance Lock, Distance Locked Loop

In one embodiment, the timer oscillator frequency is adjusted so that the number of timer clock ticks corresponding to round trip time is controlled to a desired value, i.e. a distance locked loop.

The distance locked loop may be used where one distance in a network is well known. An economical timer oscillator may be used to measure the length and then adjust the oscillator to a frequency that results in the correct length measurement.

In another application, the distance locked loop may be used to maintain geometrical proportion, i.e. measurement of one side of a triangle will set the timer oscillator frequency to maintain proportional measurement of other triangle sides.

In still another application, the frequency of the timer oscillator is compared with a reference to detect motion on one end of the link causing the link distance to change.

Timing Uses

The following is a discussion of just a few of the uses for precision timing in accordance with the present invention.

Timing Scales and Uses

Timing needs and uses vary over a wide range, from a few tens of picoseconds for coherent signal processing and antenna array applications and to support accurate distance measurement. Sporting events used to be satisfied with a tenth of a second on a stop watch, but now, are scoring milliseconds and striving for tenths of milliseconds. There is an ever increasing need for more accurate timing measurements for existing applications and as more accurate timing measurement techniques are developed, new applications are enabled that were not previously considered.

Benefits

The present invention enables precise time coordination among multiple transmitters to enable coordination of antenna patterns and multiple transmitter coherent transmissions, thus potentially increasing range, resolution, positioning accuracy, data rate, and interference rejection.

The invention allows a network of radios to operate in time synchronization and provide precision timing information to associated applications. The timing information may be accurately corrected for propagation delay between the radios.

Antenna Patterns

Antenna pattern control is very demanding, often requiring control to a fraction of a wavelength. With the present invention, multiple transmitters may be coordinated to transmit a signal to a given receiver so that the pulses and underlying waveform phase lines up at the given receiver. Alternatively, multiple receivers may be coordinated to receive a signal from a given transmitter or a given direction.

In one embodiment, the receivers and/or transmitters may operate in a different band from the band being used for timing transfer, such as for radio astronomy, or optical astronomy, or a different mode, such as infrared, optical, or acoustical.

Networks

With close timing networks can interleave data with finer precision on finer time scales, minimizing turn around time and dead air time. Networks may also utilize multiple transmitter beam forming to increase the range or data rate by transmitting the same signal, phase and time synchronous, from two or more transmitters to arrive phase and time synchronous at a receiver. Phase and time synchronous signals essentially add voltage rather than power, thus two transmitters with equal signals arrive at four times the power, which may double the range or achieve four times the data rate for a given signal to noise ratio.

In a further embodiment, networks may reduce or eliminate a signal acquisition process at the beginning of each packet. The network elements may remain in synchronous timing that requires no signal search and signal optimization process.

Distance Measurement

Precision timing enables distance measurement architectures involving the coordination of transmitters or receivers. Thus, multiple coordinated transmitters may send timing information to a receiver or multiple receivers may determine timing information from a transmitter without requiring two way communications to determine link delay to the single transmitter or receiver. The multiple transmitters or receivers may determine their geometry by surveying or by round trip timing.

Extended Timing Reference

In one embodiment, timing may be extended from an initial time reference through multiple hops while maintaining acceptable accuracy. For example, timing may be provided by GPS satellite having an initial time reference to a GPS receiver, where the timing accuracy is within plus or minus a few nanoseconds from the initial time reference. The timing at the GPS receiver may then be communicated among UWB radios having proximity to the GPS receiver, where the timing accuracy of the UWB radios is within plus or minus tens of picoseconds from the timing at the GPS receiver. Thus, a timing system having a first accuracy may be extended using a timing system having a second accuracy. As such, multiple hops among multiple UWB radios, where each hop contributes only tens of picoseconds of timing error, may be performed without significantly increasing the original GPS timing error, which is on the order of a few nanoseconds. Thus the UWB timing link, or network of links, may be an effective way to extend GPS timing to multiple locations about a GPS receiver, which could include locations inside a building, tunnel, or other locations where GPS signals could not be received. Further, where multiple users need differential accuracy, the UWB network may provide better differential accuracy than a second GPS receiver.

Figure 23:
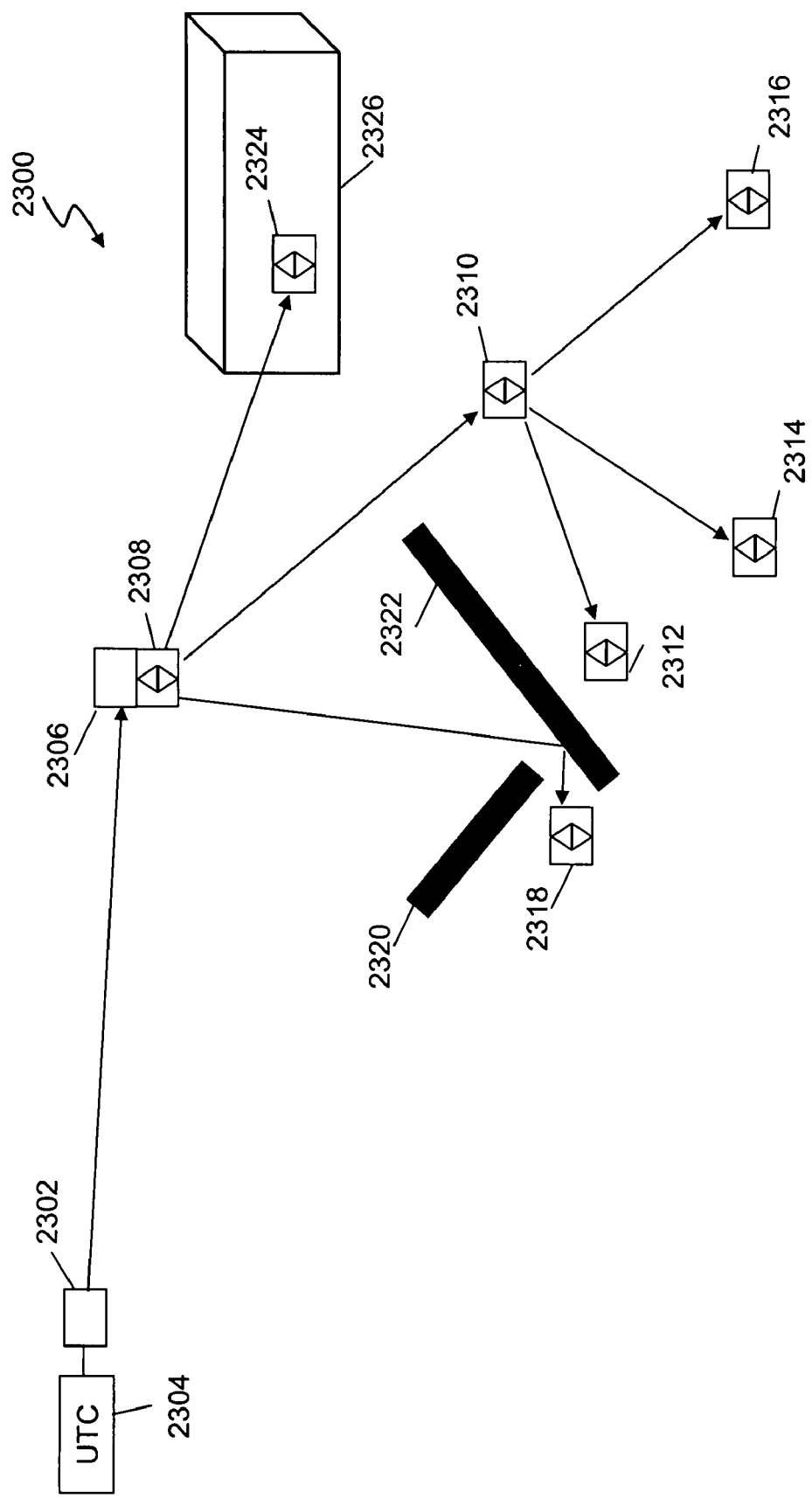
FIG. 23 illustrates an extended time reference architecture involving a combination of Global Position System (GPS) and UWB radios.

FIG. 23 depicts a dual accuracy timing transfer architecture 2300 that extends a timing reference. In FIG. 23, GPS Satellite 2302 has a timing based on an initial time reference provided by Universal Time Clock (UTC) 2304. GPS receiver 2306, which is co-located with UWB radio 2308, determines its timing based on a GPS signal it receives from GPS Satellite 2302. As such, the timing at GPS receiver 2306 is within plus or minus a few nanoseconds from the initial time reference provided by UTC 2304. UWB radio 2308 interfaces with 2306 and since it is co-located with GPS receiver 2306 also has the same timing as GPS receiver 2306. UWB radio 2308 transfers it time reference in accordance with the invention to UWB radio 2310. UWB radio 2310 thus has a time reference plus or minus tens of picoseconds from the time references of UWB radio 2308 and GPS receiver 2306. UWB radio 2310 transfers its time reference to UWB radios 2312, 2314, and 2316, which then have time references plus or minus tens of picoseconds from UWB radio 2310.

Also in FIG. 23, UWB radio 2308 transfers its time reference to UWB radio 2318, which does not have a direct path due to obstruction 2320. The time reference is transferred using multipath resulting from a UWB signal reflecting off object 2322, as described previously in relation to FIG. 3.

FIG. 23 also depicts transfer of the GPS timing reference via UWB radio 2308 to UWB radio 2324 that is within building 2326.

Further discussion about propagating timing error and techniques for assessing propagation error is provided in U.S. patent application Ser. No. 11/103,438, filed Apr. 12, 2005, titled "Method and System for Extensible Position Location", which is incorporated herein by reference. One skilled in the art will recognize that the propagation error techniques described in the patent application are readily adaptable to architectures intended to extend a timing reference in accordance with the present invention since the position error described is directly attributable to timing error.

When UWB is used to extend a GPS timing reference, widely distributed timing transfer architectures are possible. In FIG. 24, a GPS satellite 2402 sends a GPS signal used to establish a timing reference at GPS receiver 2404 that is collocated with a UWB radio 2406. The UWB radio 2406 can then transfer the timing reference to other UWB radios 2406 that may in turn transfer timing references to other UWB radios 2406, etc. as described in relation to FIG. 23. In FIG. 24, two additional GPS receivers 2408, 2410 are shown that also transfer their timing references to UWB radios about them. As such, GPS receivers that may be widely distributed about the world may be used along with groups of UWB radios to extend the GPS timing reference. Such architectures can wirelessly support precisely timed actions world wide such as troop movements, distributed race events, etc. Additionally, multiple GPS satellites can communicate with each other and/or with other GPS receivers to extend a timing reference completely around the Earth.

Long Integration

By establishing precision timing, a receiver may integrate a transmitted signal indefinitely. One of the limitations in integration of a UWB signal for detection is the frequency stability. A difference in frequency between the transmitter and receiver causes a shift in phase and loss of coherency. By locking systems in time over distance, coherency can be maintained, allowing coherent integration as long as the geometry is stable. Thus, security systems may be made more sensitive, networks and tags may achieve increased range.

Sporting Events—Timing and Distance

The present invention is capable of achieving combined timing transfer and distance measurement in one device. Thus a single system may determine the precise time a racer crosses the finish line, determining the timing of the positioning event. The system may further determine the time and position for one or more racers or game participants during the entire race or game. Thus, from start to finish, the time and position of each racer may be determined. In a game, such as a football game, precise time and position information may be collected throughout the game. The link may further include a player ID. Thus, player position data may be displayed to aid in determining which player is in each location. Such information may also be provided to subscribers, for example, wirelessly to a handheld device or through a wired or wireless internet connection. The information may be played back allowing coaches (or referees) to analyze game results. Thus, a single system provides timing, position, and data.

The system may further provide timing distribution for camera synchronization or other mechanical support functions. In an automobile race, a checkered flag indicates that participants are to maintain position and slow down for such events as an accident. A system in accordance with the present invention may provide timing, position, and flag status to car drivers and referees. Thus a checkered flag may be signaled by radio and the positions of drivers recorded precisely at that moment. Upon resuming the race, drivers could be given instructions in the form of a centering meter type display to position their car precisely relative to the checkered flag call. When all cars are within limits, a resume signal may be given. Thus, precision positioning and timing may change the way races and games are managed, analyzed and experienced by the fans.

In machine automation and robotics, precision timing and positioning may coordinate the flow of widely dispersed objects, such as traffic, or may precisely direct robotic vehicles in time and place.

In coordinating simulations, such as war games, or missile tests, or coordinating complex events such as movie sets with fast moving stunts, precision time and positioning can enable new capabilities and fine tune old ones.

In inventory control and asset management, asset tags can be increased in range and coverage by enabling longer integration of signals and precise scheduling of transmissions.

Variations

The functional elements described herein may be implemented in digital or analog circuits or a combination. A computer or processor may include associated function blocks and may be implemented using a programmable computer, digital logic, state machine, signal processor or digital controller technology. Transceiver function blocks shown separate from the processor may be implemented within a physical processor in a given implementation.

CONCLUSION

While particular embodiments of the invention have been described, it will be understood, however, that the invention is not limited thereto, since modifications may be made by those skilled in the art, particularly in light of the foregoing teachings. It is, therefore contemplated by the appended claims to cover any such modifications that incorporate those features or those improvements which embody the spirit and scope of the present invention.

What is claimed is:

1. A method for wireless synchronization of a pair of Ultra Wideband (UWB) radios, said method comprising the steps of:
   a. transmitting a first synchronization signal from a first UWB radio of said pair of UWB radios, said first synchronization signal having a signal structure comprising a synchronizing pattern and a data stream;
   b. receiving said first synchronization signal at a second UWB radio of said pair of UWB radios;
   c. synchronizing said second UWB radio with said first UWB radio based upon said synchronizing pattern of said first synchronization signal; and
   d. setting a clock of said second UWB radio based upon said data stream of said first synchronization signal for locating an object.

2. The method of claim 1, wherein the step of c. synchronizing said second UWB radio with said first UWB radio based upon said synchronizing pattern of said first synchronization signal further comprises the step of:
   c1. synchronizing a receiver time base with said synchronizing pattern of said received first synchronization signal.

3. The method of claim 2, wherein the step of d. setting a clock of said second UWB radio with said first UWB radio based upon said data stream of said first synchronization signal further comprises the step of:
   d1. setting a receiver clock in accordance with said receiver time base and said data stream of said first synchronization signal.

4. The method of claim 2, wherein said signal structure includes a code and the step of c. synchronizing said second UWB radio with said first UWB radio based upon said synchronizing attern of said first synchronization signal comprises using said code to synchronize said receiver time base with said synchronizing pattern of said first synchronization signal.

5. The method of claim 4, wherein said code is periodically changed to effectively extend a code repeat length.

6. The method of claim 4, wherein said code is applied to groups of UWB signals and the spacing between groups of UWB signals is changed to effectively extend a code repeat length.

7. The method of claim 3, further comprising the step of:
   d2. determining propagation delay and adjusting the receiver clock in accordance with propagation delay.

8. The method of claim 7, wherein the step of d2 determining propagation delay comprises one of a leading edge algorithm and a pattern matching algorithm.

9. The method of claim 3, wherein said data stream of said first synchronization signal comprises a time reference point and a time value related to a time of the time reference point.

10. The method of claim 1, wherein a distance between said first UWB radio and said second UWB radio is known and said setting a clock of said second UWB radio with said first UWB radio is based upon said distance.

11. The method of claim 10, wherein said distance was determined using one of an UWB range finding technique, a map, a blueprint, a survey, or a direct measurement.

12. The method of claim 10, wherein distances between each pair of UWB radios of a plurality of UWB radios have been determined using UWB range finding techniques.

13. The method of claim 1, wherein positions of said first UWB radio and second UWB radio are known in relation to each other and said setting a clock of said second UWB radio with said first UWB radio is based upon said positions.

14. The method of claim 13, wherein said positions were determined using UWB position determination techniques.

15. The method of claim 14, wherein relative positioning has been determined between each pair of UWB radios of a plurality of UWB radios.

16. The method of claim 1, wherein steps a through d are performed by each pair of UWB radios of a plurality of UWB radios.

17. The method of claim 1, further comprising the steps of:
   e. transmitting a second synchronization signal from said second UWB radio of said pair of UWB radios, said second synchronization signal having a second signal structure comprising a second synchronizing pattern and a second data stream;
   f. receiving said second synchronization signal at said first UWB radio of said pair of UWB radios;
   g. synchronizing said first UWB radio with said second UWB radio based upon said second synchronizing pattern of said second synchronization signal; and
   h. setting a clock of said first UWB radio based upon said second data stream of said second synchronization signal.

18. The method of claim 17, wherein steps a through h are performed by each pair of UWB radios of said plurality of UWB radios.

19. A method for synchronizing a first transceiver and a second transceiver, said method comprising the steps of:
   a. transmitting an ultra wideband signal from said first transceiver;
   b. receiving said ultra wideband signal at said second transceiver;
   c. synchronizing a second transceiver receiver time base in accordance with a synchronization pattern of said received ultra wideband signal;
   d. setting a second transceiver clock in accordance with a data stream of said received ultra wideband signal;
   e. transmitting a return ultra wideband signal from said second transceiver;
   f. receiving said return ultra wideband signal at said first transceiver; and
   g. synchronizing a first transceiver receiver time base in accordance with a synchronization pattern of said received return ultra wideband signal; and
   h. setting a first transceiver clock in accordance with a data stream of said received return ultra wideband signal and determining the location of an object.

20. A method for synchronizing a first ultra wideband radio with a second ultra wideband radio, said method comprising the steps of:
   a. transmitting an ultra wideband signal from said first ultra wideband radio in accordance with a first time base;
   b. receiving said transmitted ultra wideband signal at said second ultra wideband radio;
   c. synchronizing a second time base of said second ultra wideband radio with said first time base of said first ultra wideband radio based upon a synchronization pattern of said received ultra wideband signal; and
   d. setting a clock of said second ultra wideband radio based upon a data stream of said received ultra wideband signal and a determined distance between said first ultra wideband radio and said second ultra wideband radio.

* * * * *